(12) United States Patent
Keller et al.

(10) Patent No.: US 6,191,222 B1
(45) Date of Patent: Feb. 20, 2001

(54) POLYOXYMETHYLENE MOULDING COMPOSITIONS WITH IMPROVED HEAT STABILITY AND STABILITY AGAINST DISCOLORATION

(75) Inventors: Bruno Keller, Wackernheim; Stephanie Schauhoff, Frankfurt; Klaus Dorn, Hanau; Hartmut Alt, Brachttal; Dietrich Michelchen, Erlensee, all of (DE)

(73) Assignee: Degussa-Huls AG, Frankfurt am Main (DE)

( * ) Notice: Under 35 U.S.C. 154(b), the term of this patent shall be extended for 0 days.

(21) Appl. No.: 09/130,470

(22) Filed: Aug. 7, 1998

(30) Foreign Application Priority Data

Aug. 8, 1997 (DE) ............................................. 197 34 360

(51) Int. Cl.$^7$ ...................................................... C08L 59/00

(52) U.S. Cl. .......................................... 525/154; 524/512

(58) Field of Search .............................................. 525/154

(56) References Cited

U.S. PATENT DOCUMENTS

| 3,219,727 | 11/1965 | Kray . |
| 4,814,397 | * 3/1989 | Novak ................................ 525/154 |
| 5,141,993 | 8/1992 | Siol . |

FOREIGN PATENT DOCUMENTS

| 1128654 | 8/1960 | (DE) . |
| 0329028 | 8/1989 | (EP) . |
| 0381943 | * 8/1990 | (EP) . |

OTHER PUBLICATIONS

Derwent Abstract No. 90–232250/31 DE 3901605 A (Jul. 26, 1990).
Derwent Abstract No. 83–0238833 JP 58 023833 A (Feb. 12, 1983).

* cited by examiner

*Primary Examiner*—Patricia A. Short
(74) *Attorney, Agent, or Firm*—Pillsbury Madison & Sutro LLP

(57) ABSTRACT

Polyoxymethylene moulding compositions of the invention comprise
(i) at least one polyoxymethylene homo- and/or copolymer,
(ii) at least one conventional additive and
(iii) at least one polymeric plastics material as an additive for improving the heat stability,
and are distinguished in that
(iii) is a copolymer which is obtainable by polymerization in bulk of a mixture of
A) 60–90 parts of one or more (meth)acrylates,
B) 10–40 parts of one or more (meth)acrylamides,
C) per 100 parts of A)+B), >0.2 to 5 parts of molecular weight regulator and
D) per 100 parts of A)+B), up to 2 parts of lipophilic free radical polymerization initiators,
and in that
the moulding composition comprises (iii) in an amount of 0.01 to 2 parts, based on the sum of (i)+(ii) where all the amounts relate to parts by weight (wt/wt) and A) and B) together must give 100 parts.

By the use of relatively highly regulated bulk co- or terpolymerization for stabilizing POM moulding compositions, advantages over the use of emulsion or suspension bead polymerization result in the heat stability, in the stability against discoloration and/or in the residual monomer contents of POM moulding compositions and shaped articles and shaped films produced therefrom.

17 Claims, No Drawings

POLYOXYMETHYLENE MOULDING COMPOSITIONS WITH IMPROVED HEAT STABILITY AND STABILITY AGAINST DISCOLORATION

FIELD OF THE INVENTION

The invention relates to reinforced or non-reinforced polyoxymethylene moulding compositions with improved heat stability and stability against discoloration, shaped articles therefrom, and a process for the preparation of reinforced or non-reinforced polyoxymethylene moulding compositions with improved heat stability and stability against discoloration using certain additives. The invention particularly relates to reinforced or non-reinforced polyoxymethylene moulding compositions of (i) at least one polyoxymethylene homo- and/or copolymer, (ii) at least one conventional additive and (iii) at least one polymeric plastics material for improving the heat stability and the stability against discoloration.

Polyoxymethylene (polyacetal) is an excellent material from which the most diverse commodity objects can be produced, in particular, by injection moulding. The chemical resistance to many organic solvents and bases is of particular advantage here. Since the introduction of polyacetals on to the market, various attempts have been made to improve the properties of polyoxymethylene (POM) in a controlled manner, so that its spectrum of industrial use could be extended further.

In particular, polyoxymethylene homo- and/or copolymers are suitable for the preparation of reinforced or non-reinforced moulding compositions. To improve their processability and heat stability, polyoxymethylene homo- and/or copolymers are mixed with conventional additives and at least one additive for improving the heat stability.

BACKGROUND OF THE INVENTION

With regard to the closer prior art, the following publications are mentioned, in which polymeric plastics materials are proposed as an addition to POM in order to optimise the heat stability thereof in this way:

U.S. Pat. No. 2,993,025 (synthetic polyamides),

U.S. Pat. No. 3,204,014 (N-vinylpyrrolidone/acrylamide copolymers),

U.S. Pat. No. 3,210,322 (carboxyl group-containing polyamides, polyurethanes, substituted polyacrylamides, polyvinylpyrrolidones and hydrazines), U.S. Pat. No. 3,215,671 ((meth)acrylates and (meth) acrylamides as crosslinking agents), U.S. Pat. No. 4,464,435 (copolymers of polyesters, (meth) acrylates, (meth)acrylamides, triallyl cyanurate, diallyl phthalate, vinyl acetate and divinylbenzene), JP-B-14329/68 (copolymers of acrylamide or acrylamide derivatives with alkyl acrylates, vinyl ethers or vinyl ketones or copolymers of acrylamide derivatives and styrene), U.S. Pat. No. 3,960,984 (amide oligomer), U.S. Pat. No. 4,098,843 (dispersion of a polyamide in a carrier resin), JP-B-22669/68 (ethylene/vinyl acetate copolymers), EP-A-0 245 962 (polymers and/or oligomers which contain hydroxyl groups and at least one further functional group with a stronger Lewis basicity than the hydroxyl group), BE-A-722 268 (polyamides, polyurethanes, polyureas, polyvinylpyrrolidone, poly(meth)acrylamide, urea derivatives, amides, hydrazones, semicarbazones and alkylene-bis-phenols), JP-B-17107/67 (copolymer of acrylamide with styrene or vinylnaphthalene), EP-A-0 270 278 (mixture of a superpolyamide and a small amount of a transition metal salt), EP-A-0 270 279 (mixture of a superpolyamide and a small amount of a cyclic amidine compound), and DE-B-25 40 207 (precipitation polycondensate of formaldehyde and melamine in a molar ratio of between 1.2:1 and 10:1).

It is furthermore known to use vinyl polymers with amide or lactam groups to improve the heat stability.

EP-A-0 381 943 discloses polyoxymethylene moulding compositions which comprise, as an additive, either a) a polymer of a1) methyl, ethyl and/or n-propyl methacrylate a2) n-propyl, n-butyl and/or pentyl acrylate and a3) acrylamide and/or methacrylamide or b) a mixture of b1) polymethyl methacrylate b2) poly(n-butyl acrylate) and b3) polymethacrylamide.

The polymeric additives according to EP-A-0 381 943 are therefore copolymers which are obtained according to the instructions in EP-A-0 381 943 either by the route of the emulsion polymerization method or by the suspension bead polymerization method.

Just the large number of additives proposed to date reveals that it has not yet been possible to solve the problem of improving the heat stability of reinforced or non-reinforced polyoxymethylene moulding compositions to the complete satisfaction of those in practice. For some applications, known polyoxymethylene moulding compositions still have an inadequate heat stability, which adversely influences processing to shaped articles and, for example, contributes towards deposits on the mould or impairment of the ease of release from the mould and/or leads to discolorations and to a reduction in the mechanical properties during later use of the shaped articles. It is furthermore a disadvantage that the polyoxymethylene moulding compositions known to date may still contain formaldehyde adducts, which lead to odour nuisances during processing at elevated temperatures due to formaldehyde being split off.

Even the more recent additives proposed, for example, in EP-A 0 381 943, which are based on a copolymer or blend of (meth)acrylate/(meth)acrylamide, have so far not found acceptance in practice, since the emulsion polymers incorporated into the polyoxymethylene moulding compositions probably showed no reproducible results in respect of the heat stabilization. Furthermore, the auxiliaries remaining in the emulsion polymer which is to be used to stabilize the POM lead to discolorations or even to decomposition of the polyoxymethylene moulding composition at the usual polyoxymethylene moulding composition processing temperatures of greater than 200° C.

SUMMARY OF THE INVENTION

In view of the prior art mentioned and described herein, it was consequently an object of the invention to provide reinforced or non-reinforced polyoxymethylene moulding compositions for industrial production which are superior to the POM moulding compositions used hitherto in practice.

In particular, the new POM moulding compositions should have
  a higher heat stability,
  a lower tendency towards discoloration,
  a lower residual formaldehyde content
than the POM moulding compositions known to date. Finally, attempts are also to be made to achieve this "basic stabilization", if possible, with a single additive, which furthermore should be simple and inexpensive to prepare.

This and other objects which are not described in more detail are achieved by a polyoxymethylene moulding composition of the type described above.

By employing as additive (iii), to improve the heat stability, a copolymer which is obtainable by polymerization in bulk of a mixture of
  A) 60–90 parts of one or more (meth)acrylates,
  B) 10–40 parts of one or more (meth)acrylamides,
  C) per 100 parts of A)+B), >0.2 to 5 parts of molecular weight regulator and
  D) per 100 parts of A)+B), up to 2 parts of lipophilic free radical polymerization initiators,
and by the fact that
  the moulding composition comprises (iii) in an amount of 0.01 to 2 parts, based on the sum of (i)+(ii),
  where all the amounts relate to parts by weight (wt/wt) and A) and B) together must give 100 parts,
  the problems on which the invention is based are solved in a manner which is not readily foreseeable.

The reinforced or non-reinforced moulding composition according to the invention based on polyoxymethylene thus offers, inter alia, the following advantages over the POM moulding compositions known from the prior art, in particular over the compositions known from EP-A-0 381 943:
  Uncomplicated preparation of the additive by bulk polymerization and subsequent grinding to a powder.
  No use of solvents, which means that drying of the additive is omitted. The polymer therefore cannot contain residual solvents.
  Bulk polymers comprise no auxiliaries necessary for emulsion polymerization, such as, for example, emulsifiers, protective colloids, or other additives which lead to discolorations at the usual processing temperatures of greater than 200° C. when used in polyoxymethylene moulding compositions.
  Highly regulated copolymers do not tend to form dirt points (speck formation), as high molecular weight copolymers may show during extrusion because of crosslinking reactions which build up the molecular weight.

Component (i)

Component (i) is an essential constituent of the moulding composition according to the invention. It is polyoxymethylene homo- and/or copolymers, these being understood in the context of the invention as both a homopolymer by itself, several homopolymers mixed with one another, a copolymer by itself, several copolymers mixed with one another and mixtures which comprise one or more homopolymers together with one or more copolymers.

The polyoxymethylenes which form the main constituent (i) of the moulding compositions according to the invention can be homopolymers of formaldehyde or of trioxane or copolymers of trioxane. They can have a linear structure, but can also be branched or crosslinked. They can be employed individually or as a mixture.

Homopolymers of formaldehyde or of trioxane are understood here as those polymers in which the hemi-acetal hydroxyl end groups are stabilized chemically, for example by esterification or etherification, against degradation. Copolymers of trioxane are understood as copolymers of trioxane and at least one compound which can be copolymerized with trioxane.

The homopolymers as a rule have heat-stable end groups, such as ester or ether groups. The copolymers of formaldehyde or of trioxane advantageously have more than 50%, in particular more than 75%, of oxymethylene groups. Copolymers which contain at least 0.1 wt. % of groups of the copolymer which have at least two adjacent carbon atoms in the chain have proved to be particularly appropriate. Polyoxymethylenes which comprise 1 to 10 wt. % comonomers have acquired particular industrial importance.

Polyoxymethylene copolymers which are preferred as component (i) in the context of the invention are those which, in addition to the recurring units —$CH_2O$—, also contain up to 50, preferably 0.1 to 20, and in particular 0.3 to 10 mol % of recurring units

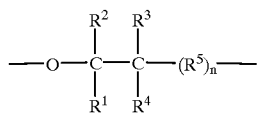

wherein $R^1$ to $R^4$ independently of one another represent a hydrogen atom, a $C_1$- to $C_4$-alkyl group or a halogen-substituted alkyl group having 1 to 4 C atoms and $R^5$ represents a —$CH_2$—, —$CH_2O$—, a $C_1$- to $C_4$-alkyl- or $C_1$- to $C_4$-haloalkyl-substituted methylene group or a corresponding oxymethylene group and n has a value in the range from 0 to 3. These groups can advantageously be introduced into the copolymers by ring opening of cyclic ethers. Preferred cyclic ethers are those of the formula

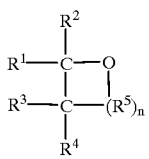

wherein $R^1$ to $R^5$ and n have the abovementioned meaning.

Suitable comonomers are, in particular, compounds of the formula

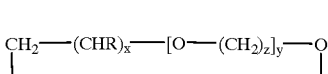

(I')

in which R denotes a hydrogen atom, an alkyl radical having 1 to 6, preferably 1, 2 or 3 carbon atoms, which can be substituted by 1, 2 or 3 halogen atoms, preferably chlorine atoms, an alkoxymethyl radical having 2 to 6, preferably 2, 3 or 4 carbon atoms, a phenyl radical or a phenoxymethyl radical, x represents an integer from 1 to 3, where y is zero, y represents an integer from 1 to 3, where x is zero and z is 2, and z represents an integer from 3 to 6, preferably 3 or 4, where x is zero and y is 1.

Suitable cyclic ethers are, above all, epoxides, e.g. ethylene oxide, styrene oxide, propylene oxide or epichlorohydrin, as well as glycidyl ethers of mono- or polyhydric alcohols or phenols.

Suitable cyclic acetals are, above all, cyclic formals of aliphatic or cycloaliphatic α,ω-diols having 2 to 8, preferably 2, 3 or 4 carbon atoms, the carbon chain of which can be interrupted by an oxygen atom at intervals of 2 carbon atoms, e.g.:

glycol formal (1,3-dioxolane), propanediol formal (1,3-dioxane)

butanediol formal (1,3-dioxepane) and diglycol formal (1,3,6-trioxocane) and 4-chloromethyl-1,3-dioxolane, hexanediol formal (1,3-dioxonane) and butenediol formal (1,3-dioxacyclohept-5-ene).

Suitable linear polyacetals are both homo- or copolymers of the cyclic acetals defined above and linear condensates of aliphatic or cycloaliphatic α,ω-diols with aliphatic aldehydes or thioaldehydes, preferably formaldehyde. Homopolymers of cyclic formals of aliphatic α,ω-diols having 2 to 8, preferably 2, 3 or 4 carbon atoms are used in particular, e.g. poly-(1,3-dioxolane), poly-(1,3-dioxane) and poly-(1,3-dioxepane).

The values for the viscosity number of the polyoxymethylenes employed according to the invention (measured on a solution of the polymer in hexafluoroisopropanol, which has been brought to pH 8 to 9 with methanolic sodium hydroxide solution, at 25° C. in a concentration of 0.3 g/100 ml) should in general be at least 160 (ml/g). The crystallite melting points of the polyoxymethylenes are in the range from 140 to 180° C., preferably 150 to 170° C., and their densities are 1.38 to 1.45 g×ml$^{-1}$, preferably 1.40 to 1.43 g×ml$^{-1}$ (measured in accordance with DIN 53 479). As a rule, the polyoxymethylenes used have a number-average molecular weight $\overline{M}_n$ of 2,000 to 200,000, preferably 10,000 to 100,000, and a volume flow index (melt volume rate, MVR) at 190° C. under a loading force of 2.16 kg, in accordance with DIN ISO 1133, of 0.5 to 200 cm$^3$/10 min, preferably 1 to 70 cm$^3$/10 min.

The preferably binary or ternary trioxane copolymers used according to the invention are prepared in a known manner by polymerizing the monomers in the presence of cationically active catalysts at temperatures of between 0 and 150° C., preferably between 70 and 140° C. (cf. e.g. DE-AS 14 20 283). Catalysts which are used here are, for example, Lewis acids, such as boron trifluoride or antimony pentafluoride, and complex compounds of such Lewis acids, preferably etherates, e.g. boron trifluoride-diethyl etherate or boron trifluoride-di-tert-butyl etherate. Further suitable catalysts are proton acids, e.g. perchloric acid, and salt-like compounds, e.g. triphenylmethyl hexafluorophosphate or triethyloxonium tetrafluoroborate, acetyl perchlorate or esters of perchloric acid, e.g. methoxymethyl perchlorate or tert-butyl perchlorate. All substances which are known to act as chain transfer agents in the polymerization of trioxane can be used to regulate the molecular weight. The polymerization can be carried out in bulk, suspension or solution. To remove unstable contents, the copolymers can be subjected to thermal or hydrolytic, controlled partial degradation to primary alcohol end groups (cf. e.g. DE-AS 14 45 273 and 14 45 294).

The homopolymers of formaldehyde or of trioxane used according to the invention are likewise prepared in a known manner by catalytic polymerization of the monomer (cf. e.g. DE-AS 10 37 705 and 11 37 215).

Polymers which are built up from trioxane and 1 to 10 wt. % ethylene oxide, 1,3-dioxolane or butanediol formal have acquired special importance. Compounds with several polymerizable groups in the molecule, e.g. alkylglycidyl formals, polyglycol diglycidyl ethers, alkanediol diglycidyl ethers, e.g. 1,4-butanediol diglycidyl ether or bis-(alkanetriol) triformals, can preferably also be used as additional comonomers for trioxane. However, diformals, e.g. diglycerol diformal, are also suitable, in particular for the preparation of terpolymers of trioxane.

They are usually employed in an amount of 0.05 to 5 wt. %, preferably 0.1 to 2 wt. %, based on the total amount of monomers.

The moulding composition according to the invention comprises component (i) in an amount of 40 to 99.99, advantageously 70 to 99.99, and in particular 95 to 99.9 wt. %, based on the weight of components (i), (ii) and (iii). The moulding composition according to the invention particularly advantageously comprises components (i), (ii) and (iii).

Component (ii)

Component (ii) is another essential constituent of the reinforced or non-reinforced polyoxymethylene moulding composition according to the invention. This is an additive, but several additives can also be employed simultaneously.

One or more additives (ii) are used, depending on how the advantageous profile of properties of the moulding composition according to the invention is to be varied further, it being possible for the amount of (ii) to be up to ⅘ of the amount of (i)+(ii), but the amount preferably being lower than the amount of component (i).

The additives (ii) can originate from the most diverse classes of compounds and have the most diverse technical effects. Possible additives (ii) are all those additives which are usually envisaged for use in reinforced or non-reinforced polyoxymethylene moulding compositions.

Examples of suitable additives (ii) are costabilizers, reinforcing fillers, such as glass fibres, carbon fibres, wollastonites and chalk, talc, carbon black and potassium titanates, nucleating agents, antistatics, light stabilizers and flameproofing agents, slip agents and lubricants, plasticizers, antioxidants, pigments, dyestuffs, optical brighteners, internal release agents, impact modifiers, such as polyurethane rubbers or graft rubbers based on (meth)acrylic acid esters polymerized in, (meth)acrylonitrile polymerized in and/or butadiene polymerized in, and polymers such as polyalkylene terephthalates.

Thermoplastic polyurethanes (TPU) enjoy particular preference among the additives (ii).

Suitable TPUs can be prepared, for example, by reaction of a) organic, preferably aromatic diisocyanates, b) polyhydroxy compounds with molecular weights of 500 to 8000 and c) chain lengthening agents with molecular weights of 60 to 400 in the presence of, where appropriate, d) catalysts, e) auxiliary substances and/or additives.

The following applies to the starting substances (a) to (c), catalysts (d) and auxiliary substances and additives (e) which can be used for this:

a) Possible organic diisocyanates (a) are, for example, aliphatic, cycloaliphatic and, preferably, aromatic diisocyanates. Examples which may be mentioned specifically are: aliphatic diisocyanates, such as hexamethylene diisocyanate, cycloaliphatic diisocyanates, such as isophorone diisocyanate, cyclohexane 1,4-diisocyanate, 1-methylcyclohexane 2,4- and 2,6-diisocyanate and the corresponding isomer mixtures, dicyclohexylmethane 4,4'-, 2,4'- and 2,2'-diisocyanate and the corresponding isomer mixtures and, preferably, aromatic diisocyanates, such as toluylene 2,4-diisocyanate, mixtures of toluylene 2,4- and 2,6-diisocyanate, diphenylmethane 4,4'-, 2,4'- and 2,2'-diisocyanat. Mixtures of diphenylmethane 2,4'- and 4,4'-diisocyanate, urethane-modified liquid diphenylmethane 4,4'- and/or 2,4'-diisocyanate, 4,4'-diisocyanato-1,2-diphenylethane and naphthylene 1,5-diisocyanate. Hexamethylene diisocyanate, isophorone diisocyanate, naphthylene 1,5-diisocyanate, diphenylmethane diisocyanate isomer mixtures with a diphenylmethane 4,4'-diisocyanate content of greater than 96 wt. % and, in particular, diphenylmethane 4,4'-diisocyanat are preferably used.

b) Suitable higher molecular weight polyhydroxy compounds (b) with molecular weight of 500 to 8000 are preferably polyether-ols and polyester-ols. However, polymers containing hydroxyl groups, for example polyacetals, such as polyoxymethylene, and, above all, water-insoluble formals, e.g. polybutanediol formal and polyhexanediol formal, and polycarbonates, in particular those of diphenyl carbonate and 1,6-hexanediol prepared by transesterification, with the abovementioned molecular weights are also possible. The polyhydroxy compounds must be at least predominantly linear, i.e. built up difunctionally in the sense of the isocyanate reaction. The polyhydroxy compounds mentioned can be used as individual components or in the form of mixtures.

Suitable polyether-ols can be prepared by reacting one or more alkylene oxides having 2 to 4 carbon atoms in the alkylene radical with a starter molecule which contains two bonded active hydrogen atoms. Alkylene oxides which may be mentioned are e.g.: ethylene oxide, 1,2-propylene oxide, 1,2- and 2,3-butylene oxide. Ethylene oxide and mixtures of 1,2-propylene oxide and ethylene oxide are preferably used. The alkylene oxides can be used individually, alternately in succession or as a mixture. Possible starter molecules are, for example: water, aminoalcohols, such as N-alkyl-diethanolamines, for example N-methyl-diethanolamine, and diols, such as ethylene glycol, 1,3-propylene glycol, 1,4-butanediol and 1,6-hexanediol. If appropriate, mixtures of starter molecules can also be employed. Suitable polyether-ols are furthermore the hydroxyl group-containing polymerization products of tetrahydrofuran (polyoxytetramethylene glycols)

Polyether-ols from 1,2-propylene oxide and ethylene oxide in which more than 50%, preferably 60 to 80% of the OH groups are primary hydroxyl groups and in which at least some of the ethylene oxide is arranged as a terminal block are preferably used; e.g. in particular polyoxytetramethylene glycols.

Such polyether-ols can be obtained by e.g. first polymerizing the 1,2-propylene oxide and then the ethylene oxide on to the starter molecule, or first copolymerizing all the 1,2-propylene oxide in a mixture with some of the ethylene oxide and then polymerizing on the remainder of the ethylene oxide, or, stepwise, first polymerizing on to the starter molecule some of the ethylene oxide, then all of the 1,2-propylene oxide and then the remainder of the ethylene oxide.

The substantially linear polyether-ols have molecular weights of 500 to 8000, preferably 600 to 6000, and in particular 800 to 3500. They can be used either individually or in the form of mixtures with one another.

Suitable polyester-ols can be prepared, for example, from dicarboxylic acids having 2 to 12 carbon atoms, preferably 4 to 8 carbon atoms, and polyhydric alcohols. Possible dicarboxylic acids are, for example: aliphatic dicarboxylic acids, such as succinic acid, glutaric acid, adipic acid, suberic acid, azelaic acid and sebacic acid, and aromatic dicarboxylic acids, such as phthalic acid, isophthalic acid and terephthalic acid. The dicarboxylic acids can be used individually or as mixtures, e.g. in the form of a succinic, glutaric and adipic acid mixture. Likewise, mixtures of aromatic and aliphatic dicarboxylic acids can be employed. For the preparation of the polyester-ols it may be advantageous, where appropriate, to use, instead of the dicarboxylic acids, the corresponding dicarboxylic acid derivatives, such as dicarboxylic acid esters having 1 to 4 carbon atoms in the alcohol radical, dicarboxylic acid anhydrides or dicarboxylic acid chlorides. Examples of polyhydric alcohols are glycols having 2 to 10, preferably 2 to 6 carbon atoms, such as ethylene glycol, diethylene glycol, 1,4-butanediol, 1,5-pentanediol, 1,6-hexanediol, 1,10-decanediol, 2,2-Dimethyl-1,3-propanediol, 1,3-propanediol and dipropylene glycol. The polyhydric alcohols can be used by themselves or, if appropriate, in mixtures with one another, depending on the desired properties.

Esters of carbonic acid with the diols mentioned, in particular those having 4 to 6 carbon atoms, such as 1,4-butanediol and/or 1,6-hexanediol, condensation products of ω-hydroxycaproic acid and, preferably, polymerization products of lactones, for example optionally substituted ω-caprolactones, are furthermore suitable.

Dialkylene glycol polyadipates having 2 to 6 carbon atoms in the alkylene radical, such as e.g. ethane diol polyadipates, 1,4-butanediol polyadipates, ethanediol-1,4-butanediol polyadipates, 1,6-hexanediol-neopentylglycol polyadipates, polycaprolactones and, in particular, 1,6-hexanediol-1,4-butanediol polyadipates, are preferably used as the polyester-ols. The polyester-ols have molecular weights of 500 to 6000, preferably 800 to 3500.

c) Possible chain lengthening agents (c) with molecular weights of 60 to 400, preferably 60 to 300, are preferably aliphatic diols having 2 to 12 carbon atoms, preferably 2, 4 or 6 carbon atoms, such as e.g. ethanediol, 1,6-hexanediol, diethylene glycol, dipropylene glycol and, in particular, 1,4-butanediol. However, diesters of terephthalic acid with glycols having 2 to 4 carbon atoms, such as e.g. terephthalic acid-bis-ethylene glycol or -1,4-butanediol, hydroxyalkylene ethers of hydroquinone, such as e.g. 1,4-di-(β-hydroxyethyl)-hydroquinone, (cyclo)aliphatic diamines, such as e.g. 4,4'-diamino-dicyclohexylmethane, 3,3'-dimethyl-4,4'-diamino-dicyclohexylmethane, isophorone-diamine, ethylenediamine, 1,2- and 1,3-propylene-diamine, N-methyl-1,3-propylene-diamine, N,N'-dimethyl-ethylenediamine and aromatic diamines, such as e.g. 2,4- and 2,6-toluylene-diamine, 3,5-diethyl-2,4- and -2,6-toluylene-diamine and primary ortho-di-, tri- and/or tetraalkyl-substituted 4,4'-diamino-diphenylmethanes.

The build-up components (b) and (c) can be varied in relatively wide molar ratios to establish the hardness and melting point of the TPU. Molar ratios of polyhydroxy compounds (b) to chain lengthening agents (c) of 1:1 to 1:12, in particular of 1:1.8 to 1:6.4 have proved appropriate, the hardness and the melting point of the TPU increasing with increasing content of diols.

For the preparation of the TPU, the build-up components (a), (b) and (c) are reacted in the presence of, where appropriate, catalysts (d), auxiliary substances and/or additives (e) in amounts such that the equivalent ratio of NCO groups of the diisocyanates (a) to the sum of the hydroxyl groups or hydroxyl and amino groups of components (b) and (c) is 1:0.85 to 1.20, preferably 1:0.95 to 1:1.05, and in particular 1:0.98 to 1.02.

d) Suitable catalysts which, in particular, accelerate the reaction between the NCO groups of the diisocyanates (a) and the hydroxyl groups of the build-up components (b) and (c) are the usual tertiary amines known from the prior art, such as e.g. triethylamine, dimethylcyclohexylamine, N-methylmorpholine, N,N'-dimethylpiperazine, 2-(dimethyl-aminoethoxy)-ethanol, diazabicyclo-(2,2,2)-octane and the like and, in particular, organic metal compounds, such as titanic acid esters, iron compounds, such as e.g. iron(III) acetylacetonate, tin compounds, e.g. tin diacetate, tin dioctoate, tin dilaurate or the tin-dialkyl salts of aliphatic carboxylic acids, such as dibutyltin diacetate, dibutyltin dilaurate or the like. The catalysts are usually employed in amounts of 0.001 to 0.1 part per 100 parts of polyhydroxy compound (b).

In addition to catalysts, auxiliary substances and/or additives (e) can also be incorporated into the build-up components (a) to (c). Examples which may be mentioned are lubricants, inhibitors, stabilizers against hydrolysis, light, heat or discoloration and plasticizers.

Further details on the abovementioned auxiliary substances and additives can be found in the technical literature, for example the monograph by J. H. Saunders and K. C. Frisch "High Polymers", volume XVI, Polyurethane [Polyurethanes], part 1 and 2, Verlag Interscience Publishers 1962 and 1964 or DE-OS 29 01 774.

Preferred components (ii) in the moulding composition according to the invention are furthermore compounds which are suitable for trapping formaldehyde (formaldehyde scavengers), plasticizers, lubricants, antioxidants, adhesion promoters, light stabilizers and pigments.

Slip agents and lubricants can belong to the most diverse classes of substances, such as e.g. metal stearates, waxes, fatty acid amides (such as e.g. bis-stearoyl-ethylenediamide), hydroxycarboxylic acid amides, fatty acids, fatty acid esters, paraffin waxes, synthetic paraffins, low molecular weight or oligomeric polyolefin waxes (such as e.g. polyethylene waxes), polyolefin waxes with polar modification by grafting, alcohols (such as e.g. palmityl alcohol, stearyl alcohol, tallow fatty alcohol), ketones (such as e.g. stearone), silicones (such as e.g. polydimethylsiloxane), silicone oils, polysiloxanes, acrylyl-modified polysiloxanes, polytetrafluoroethylene (PTFE), polyalkylene glycols, specific fatty acid esters, such as are described in DE 41 17 655.

Esters of polyhydric alcohols (such as e.g. ethylene glycol, diethylene glycol, butanediol, glycerol, diglycerol, pentaerythritol, sorbitol) with long-chain fatty acids (e.g. stearic acid, behenic acid, palmitic acid, capric acid, lauric acid, linoleic acid, erucic acid) are particularly preferred. The hydroxyl groups of the alcohol in the carboxylic acid ester can be either completely esterified or only partly esterified. Glycerol esters based on saturated fatty acids in which not all the hydroxyl groups are esterified are particularly preferred.

Further information on the abovementioned slip agents and lubricants is given in Ullmanns Enzyklopädie der Technischen Chemie [Ullmann's Encyclopedia of Industrial Chemistry], volume 15, Verlag Chemie, 4th edition (1978) 268–270, Additives for Plastics Handbook, J. Murphy, Elsevier Advanced Technology (1996) 239–255 or Polymere Werkstoffe [Polymeric Materials], volume 2, H. Batzer, Thieme-Verlag (1984) 328–337.

Light stabilizers which can be used are in principle all the substances considered suitable for this purpose by the person skilled in the art. They can be employed individually or as a mixture. Light stabilizers based on benzotriazole derivatives (such as e.g. 2-(2'-hydroxy-3',5'-di(1,1-dimethylbenzyl)phenyl)-benzotriazole), benzophenone derivatives, aromatic benzoate derivatives, phenyltriazines, cinnamic acid amides (as described e.g. in WO 97/13749), or sterically hindered amine compounds (HALS), for example derivatives of 2,2,6,6-tetramethylpiperidine (such as e.g. a dimethylsuccinate polymer with 4-hydroxy-2,2,6,6-tetramethyl-1-piperidinethanol), have proved to be particularly advantageous.

Further details on suitable light stabilizers are to be found in the monograph by J. F. Rabek, Photostabilization of Polymers; Principles and Applications, Elsevier Applied Science, N.Y., 1990.

Polyamides which can be used as additives are also known per se. Semi-crystalline or amorphous resins such as are described e.g. in the Encyclopedia of Polymer Science and Engineering, vol. 11, p.p. 315 to 489, John Wiley & Sons, Inc. 1988 can be employed, the melting point of the polyamide preferably being below 225° C., preferably below 215° C.

Examples of these are polyhexamethylene-azelaic acid amide, polyhexamethylene-sebacic acid amide, polyhexamethylene-dodecanedioic acid amide, poly-11-aminoundecanoic acid amide and bis-(p-aminocyclohexyl)-methane-dodecanoic acid diamide or the products obtained by ring opening of lactams, e.g. or polylauryllactam. Polyamides based on terephthalic or isophthalic acid as the acid component and/or trimethylhexamethylenediamine or bis-(p-aminocyclohexyl)-propane as the diamine component and polyamide base resins which have been prepared by copolymerization of two or more of the abovementioned polymers or components thereof are also suitable.

Particularly suitable polyamides which may be mentioned are mixed polyamides based on caprolactam, hexamethylenediamine, p,p'-diamino-dicyclohexylmethane and adipic acid. An example here is the product marketed by BASF Aktiengesellschaft under the name Ultramid® 1 C.

Further suitable polyamides are marketed by the company Du Pont under the name Elvamide®.

The preparation of these polyamides is also described in the abovementioned reference. The ratio of terminal amino groups to terminal acid groups can be controlled by varying the molar ratio of the starting compounds.

The content of polyamide in the moulding composition according to the invention is preferably 0.005 to 1.99 wt. %, in particular 0.01 to 1.5 wt. %.

In some cases the dispersibility of the polyamides used can be improved by co-using a polycondensation product of 2,2-di-(4-hydroxyphenyl)propane (bisphenol A) and epichlorohydrin.

Such condensation products of epichlorohydrin and bisphenol A are commercially obtainable. Processes for their preparation are also known to the person skilled in the art.

Trade names of the polycondensates are Phenoxy® (Union Carbide Corporation) and Epikote® (Shell). The molecular weight of the polycondensates can vary within wide limits; in principle, the commercially obtainable types are all suitable.

Polyoxymethylene moulding compositions can also comprise small amounts of one or more alkaline earth metal silicates and/or alkaline earth metal glycerophosphates as additives. Calcium and, in particular, magnesium have proved to be excellently suitably as alkaline earth metals for the formation of the silicates and glycerophosphates. Calcium glycerophosphate and, preferably, magnesium glycerophosphate and/or calcium silicate and, preferably, magnesium silicate are expediently used, preferred alkaline earth metal silicates being, in particular, those which are described by the formula $$Me.x\ SiO_2.n\ H_2O$$

in which
- Me denotes an alkaline earth metal, preferably calcium or, in particular, magnesium,
- x denotes a number from 1.4 to 10, preferably 1.4 to 6, and
- n denotes a number equal to or greater than 0, preferably 0 to 8.

The additives are advantageously employed in finely ground form. Products having an average particle size of less than 100 μm, preferably of less than 50 μm, are particularly suitable.

The moulding compositions according to the invention can also comprise amounts of a fibrous or particulate filler or mixtures thereof as an additive.

Examples of reinforcing fillers which may be mentioned are potassium titanate whisker, carbon fibres and, preferably, glass fibres, it being possible for the glass fibres to be employed e.g. in the form of glass woven fabrics, mats, nonwovens and/or glass silk rovings or cut glass silk of low-alkali E-glass with a diameter of 5 to 200 μm, preferably 8 to 50 μm, the fibrous fillers preferably having an average length of 0.05 to 1 mm, in particular 0.1 to 0.5 mm, after their incorporation.

Other suitable additional fillers are, for example, wollastonite, calcium carbonate, glass beads, quartz flour, silicon nitride and boron nitride or mixtures of these fillers.

Preferred combinations of fillers are: Wollastonite with glass fibres, mixing ratios of 5:1 to 1:5 being preferred.

Antioxidants, which can be employed individually or as mixtures, can also be employed.

Substances which have proved to be particularly effective and are therefore preferably used are 2,2'-methylene-bis-(4-methyl-6-tert.-butyl-phenyl), 1,6-hexanediol bis-[3,5-di-tert.-butyl-4-hydroxyphenyl)propionate (Irganox® 259), pentaerythrityl tetrakis-[3-(3,5-di-tert.-butyl-4-hydroxyphenyl)-propionate] (Irganox® 1010), diethylene glycol bis-[3-[3-(tert.-butyl)-4-hydroxy-5-methylphenyl]-propionate], or triethylene glycol-bis-[3-(3-(tert.-butyl)-4-hydroxy-5-methylphenyl]-propionate] (Irganox® 245) from Ciba-Geigy, which is very particularly suitable.

These additives can be present in the moulding composition according to the invention in the most diverse amounts, the amount in question of the particular additive (ii) used depending in the individual case on what specific beneficial technical effect it is intended to achieve with it. The additives (ii) are expediently used in the moulding composition according to the invention in the usual amounts known from the prior art, amounts of 0.01 to 40 wt. %, based on the weight of components (i), (ii) and (iii), being particularly advantageous.

Component (iii)

The constituent essential to the invention in the reinforced or non-reinforced polyoxymethylene moulding compositions according to the invention is the polymeric plastics material (iii) employed as an additive to improve the heat stability. Component (iii) is therefore an essential component.

The polymeric plastics material (iii) is present in the moulding composition according to the invention in an amount of 0.01 to 2 parts, based on the sum of (i)+(ii). In general, it is not advisable here to increase the content of the polymeric material (iii) in the moulding composition according to the invention beyond 2 parts, based on 100 parts of A+B, because the advantages which can still be achieved as a result no longer justify the higher consumption of polymeric material (iii). Furthermore, under certain circumstances demixing of the polymeric material (iii) and the moulding composition according to the invention may occur. On the other hand, the amount of polymeric material (iii) in the moulding composition according to the invention should not fall below 0.01 part, because otherwise the advantageous technical effects brought about by the polymeric material (iii) cannot always meet the demands of practice to the full extent. The range of 0.01 to 2 parts is therefore an optimum, within which the content of polymeric material (iii) in the moulding composition according to the invention can be varied and can be adjusted to suit the other particular essential constituents used in the moulding composition according to the invention. Within this preferred range, a narrower window is particularly expedient, so that in a particularly preferred embodiment the moulding composition according to the invention is characterized in that the moulding composition comprises (iii) in an amount of 0.02 to 1 part, based on the sum of (i)+(ii), calculated as 100 parts. Within this particularly expedient range within which the moulding composition according to the invention is particularly advantageous and which is outstandingly suitable for the production of shaped articles and films, the range of 0.05 to 0.5 part, again based on the sum of (i)+(ii), calculated as 100 parts, is to be emphasized, because an excellent profile of use properties of the moulding composition according to the invention in question results from such a content of polymeric plastics material (iii). This means that the amount of polymeric plastics material (iii) as an additive for improving the heat stability of reinforced or non-reinforced polyoxymethylene moulding compositions is outstandingly balanced in respect of the amount of material used on the one hand and the advantageous technical effect achieved with it on the other hand, and is therefore especially preferred according to the invention.

In principle, the polyoxymethylene moulding composition according to the invention can comprise the constituents (i), (ii) and (iii), which means that the polyoxymethylene moulding composition can comprise still further constituents which are not mentioned in the description. In a particularly preferred embodiment, however, the moulding composition consists of the three components (i), (ii) and (iii) mentioned.

As already stated, (iii) is a copolymer which is obtainable by polymerization in bulk. This is understood as a polymerization process in which monomers are polymerized without a solvent, so that the polymerization reaction takes place in substance or in bulk. Polymerization in emulsion (so-called emulsion polymerization) and polymerization in dispersion (so-called suspension polymerization), in which the organic monomer is suspended in an aqueous phase with protective colloids and/or stabilizers and more or less coarse polymer particles are formed, are to be seen in contrast to this. A particular form of polymerization in a heterogeneous phase system is bead polymerization, which is substantially to be regarded as suspension polymerization.

Component A) of the Bulk Polymer (iii)

Component A), which can be employed to obtain the bulk copolymer according to the invention (component (iii)), is one or more (meth)acrylates. The term "(meth)acrylates" in principle is understood as meaning esters of acrylic acid and also esters of methacrylic acid, which have a polymerizable vinylic double bond in the molecule.

Component A) can consist of one or more methacrylates. These can optionally comprise one or more acrylates. In a particular variant of the invention, (iii) is therefore a copolymer which is obtainable by bulk polymerization of a mixture wherein
A) comprises
A1) 35–90 parts of one or more methacrylates of the general formula I

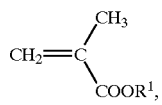
(I)

wherein $R^1$ denotes a linear or branched alkyl radical having 1 to 12 carbon atoms,
and
A2) 0–25 parts of one or more acrylates of the general formula II

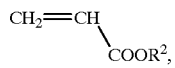
(II)

wherein $R^2$ denotes a linear or branched alkyl radical having 1 to 12 carbon atoms,
where A1) and A2) together give 60–90 parts and the sum of the parts of A1), A2) and B) gives 100.

In a preferred embodiment according to the invention, only one compound, preferably MMA, is employed as component A).

Although the advantages of the invention can already be obtained with a copolymer which is obtainable by polymerization in bulk of a mixture which comprises only one component A), in the context of the invention particularly favourable moulding compositions are also obtained if (iii) is a copolymer which is obtainable by bulk polymerization of a mixture wherein
A) comprises
A1) 34–89 parts of one or more methacrylates of the general formula I

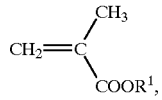
(I)

wherein $R^1$ denotes a linear or branched alkyl radical having 1 to 12 carbon atoms,
and A2) 1–25 parts of one or more acrylates of the general formula II

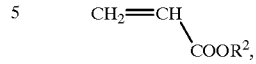
(II)

wherein $R^2$ denotes a linear or branched alkyl radical having 1 to 12 carbon atoms,
where A1) and A2) together give 60–90 parts and the sum of the parts of A1), A2) and B) gives 100.

Particularly preferred compounds of the formula I in the context of the invention are those in which $R^1$ is methyl, ethyl and/or n-propyl. Mixtures of compounds in which $R^2$ in the general formula II denotes n-propyl, n-butyl and/or n-pentyl are furthermore particularly expedient.

Particularly favourable mixtures which can be adjusted to suit the particular circumstances are obtained by using a mixture of A1) and A2), since the compounds of the formula II can lower the glass transition temperature of the bulk polymer considerably and in this way facilitate its processability.

Component B) of the Bulk Polymer (iii)

The person skilled in the art is generally familiar with the (meth)acrylamides to be employed as constituent B) in the context of the invention. In a preferred embodiment of the moulding composition according to the invention, acrylamide and/or methacrylamide is employed as component B). The amount of component B) in the bulk polymer (iii) is in the range of 10–40 parts, where A1) (essential), A2) (optional) and B) (essential) together should give 100 parts.

As already stated, a substantial difference between the copolymers (iii) to be employed according to the invention and the polymeric plastics materials known from the prior art is that the copolymers according to the invention can be obtained by bulk or substance polymerization. It has been found here completely unexpectedly that, evidently due to the nature of the bulk polymerization, copolymers with a lower molecular weight than those which result, for example, in emulsion or suspension polymerization are significantly superior to these in the action in respect of heat stabilization of polyoxymethylene moulding compositions.

Component C) of the Bulk Polymer (iii)

>0.2 to 5 parts of molecular weight regulators are another constituent C) which is essential for the bulk polymerization to produce the copolymers (iii) according to the invention. These include in principle all compounds which can be employed in bulk polymerization for regulating the molecular weight and with which the person skilled in the art is familiar. An incomplete list of these includes, inter alia, 4-methyl-2,4-diphenylpent-1-ene 1,1'-(1,1-dimethyl-3-methylen-1,1-propenediyl)-bisbenzene, α-methylstyrene, and aliphatic mercapto compounds, such as e.g. ethyl mercaptoacetate, 2-ethylhexyl mercaptoacetate, methyl 3-mercaptopropionate, 2-ethylhexyl mercaptopropionate, trimethylolpropane trimercaptoacetate, glycol dimercaptoacetate, pentaerythritol tetrakis-mercaptoacetate, 1-propanethiol, 2-propanethiol, n-dodecylmercaptan (1-dodecanethiol), tert.-dodecylmercaptan.

Of the abovementioned compounds, n-dodecylmercaptan is particularly preferred. The amount of molecular weight regulator is adjusted here in the context of the invention such that copolymers which preferably have low viscosity numbers result. For this reason, amounts of 0.8 to 2 parts are particularly preferred. The regulation of the bulk polymerization moreover also represents a possibility for influencing the Tg of component (iii). Lowering of the Tg of (iii) is achieved with more regulator, in addition to the "soft" component A2).

Component D) of the Bulk Polymer (iii)

Lipophilic free radical polymerization initiators are a further component which can be present in the mixture in an amount of up to two parts and is employed to produce the bulk copolymers of the invention (component (iii)). Although the polymerization reaction in principle can be initiated in any manner with which the person skilled in the art is familiar (for example by radiation or the like), initiation with appropriate lipophilic polymerisation initiators is preferred. The free radical polymerization initiators are lipophilic, in particular, so that they dissolve in the mixture of the bulk polymerization. Compounds which can be employed include, in addition to the conventional azo initiators, such as AIBN or 1,1-azobiscyclohexanecarbonitrile, inter alia aliphatic peroxy compounds, such as e.g. tert.-amyl peroxyneodecanoate, tert.-amyl peroxypivalate, tert.-butyl peroxypivalate, tert.-amyl peroxy-2-ethylhexanoate, tert.-butyl peroxy-2-ethylhexanoate, tert.-amyl peroxy-3,5,5-trimethylhexanoate, ethyl 3,3-di-(tert.-amylperoxy)-butyrate, tert.-butyl perbenzoate, tert.-butyl hydroperoxide, decanoyl peroxide, lauryl peroxide, benzoyl peroxid and any desired mixtures of the compounds mentioned. Of the abovementioned compounds, lauryl peroxide is especially preferred.

In an extremely expedient embodiment, the moulding composition of the invention is characterized in that (iii) is a copolymer which is obtainable by bulk polymerization of 35 to 90 parts of A1), 0 to 25 parts of A2), 10 to 40 parts of B), 0.2 to 5 parts of C) and 0.1 to 2 parts of D), where A1)+A2)+B) must give 100 parts (wt/wt). Copolymers of 50 to 80 parts of A1), 0 to 20 parts of A2), 20 to 40 parts of B), 0.2 to 5 parts of C) and 0.1 to 2 parts of D), where A1)+A2)+B) must give 100 parts (wt/wt), are particularly expedient.

Finally, in yet a further embodiment, it is preferable if methyl methacrylate is used as A1), n-butyl acrylate is used as A2), methacrylamide is used as B), n-dodecylmercaptan is used as C) and lauryl peroxide is used as D).

As already stated, a polymer (copolymer) which differs significantly from emulsion polymerization or suspension polymerization of comparable monomer mixtures is obtained by the route of bulk polymerization. Since the products obtainable in bulk polymerization are often poorly soluble or not soluble at all in conventional solvents, they are preferably ground to a fine powder before being employed in polyoxymethylene. This fine powder is incorporated into the moulding composition material in the conventional manner.

The copolymers (iii) to be employed according to the invention in polyoxymethylene moulding compositions furthermore preferably have a Tg of $\leq 145°$ C., preferably $\leq 140°$ C.

In terms of the method, the preparation of the moulding composition according to the invention has no major peculiarities. Rather, it is obtained by the conventional and known method for the preparation of moulding compositions. For this, components (i), (ii) and (iii) of the moulding composition according to the invention can be fed individually or in the form of one or more pre-prepared mixtures to a suitable mixing device and mixed there at temperatures of 0 to 260° C. It is advantageous here to mix components (i), (ii) and (iii) of the moulding composition according to the invention intensively at temperatures of 0 to 150° C., preferably 0 to 50° C., to introduce the pre-prepared mixture resulting from this into an extruder, preferably a multiscrew extruder, which is equipped with a degassing device, if appropriate, and to melt it at temperatures of 150 to 260° C., preferably 200 to 250° C., to degas and extrude the resulting melt, and thereafter to discharge it from the extruder in question. After cooling, the moulding composition according to the invention obtained in this manner can be granulated. The resulting granules can be stored intermediately or used directly for the production of films or shaped articles, the conventional and known methods of blow moulding and injection moulding being possible for the production of films and shaped articles from the moulding composition according to the invention.

The invention consequently also provides a process for the production of a shaped article or a film from a moulding composition by (1) melting and mixing the constituents of the moulding composition in an extruder at 150 to 260° C.

and (2) processing by shaping of the moulding composition resulting from this to give the shaped article in question or the film in question, reinforced or non-reinforced polyoxymethylene moulding compositions with the features described above in this specification being employed.

Compared with known moulding compositions, the moulding composition according to the invention shows, in addition to good mechanical properties, a significant improvement in heat stability and a lower tendency towards discoloration, as well as a reduced residual formaldehyde content. The moulding composition according to the invention is therefore outstandingly suitable for the production of films and shaped articles. The shaped articles are advantageously used in the vehicle, electrical appliance and electronics industry.

The invention also provides the use of copolymers obtainable by bulk polymerization of a mixture of A) 60–90 parts of one or more (meth)acrylates,
B) 10–40 parts of one or more (meth)acrylamides,
C) per 100 parts of A)+B) >0.2–5 parts of molecular weight regulator and D) per 100 parts of A)+B) up to 2 parts of lipophilic free radical polymerization initiators, where all the amounts relate to parts by weight (wt/wt) and A) and B) are chosen such that together they give 100 parts, for heat stabilization of moulding compositions which comprise polyoxymethylene homo- and/or copolymers.

The invention also provides shaped articles and semi-finished products from the moulding compositions described herein or comprising these moulding compositions, and films of or comprising moulding compositions according to the invention. Semi-finished products here are thermoplastic shaped articles which can be further processed, such as sheets, pipes, profiles etc., which do not necessarily have to but may be produced by injection moulding.

In a particular advantageous modification of the use according to the invention, copolymers are employed in an amount of 0.1 to 2 parts, based on 100 parts of moulding composition, the 100 parts being calculated without the copolymers used for the heat stabilization.

DETAILED DESCRIPTION OF THE PREFERRED EMBODIMENTS

The following examples serve to illustrate the subject matter of the invention.

1. The general procedure of bulk polymerization for the preparation of copolymers which can be used according to the invention will first be described. "Copolymers" here and for the entire description means a polymer which comprises at least 2 monomers which differ from one another. In particular, thus, also terpolymers etc. The data on the recipe, process parameters and specifications required for the preparation of the examples according to the invention can be seen from the tables which follow.

1.1 Apparatus
  a) Glass beaker with a magnetic stirrer (laboratory batches) or heatable metal tank with a stirrer (pilot, plant batches) for preparing the monomer mixture.
  b) Mould comprising 2 glass plates*, between which plastic piping is inserted as a seal. The distance between the glass plates and therefore the thickness of the polymer sheet to be produced is controlled via the diameter of the piping. The piping covers three sides of the mould; the fourth side remains open, or is closed with piping after filling. To avoid adhesion of the polymer to the glass or to the piping, the glass plates are covered with a release film (e.g. ®Hostaphan RV 36/Putz). The mould is fixed by special clamps on three sides.
  * Specification of the glass plates: ®SECURIT-Glas (Glaskontor, Gebr. Wolff+Co., Kinzigheimer Weg 100, Hanau)
  c) Water baths of suitable size heated electrically or with steam and with temperature regulation. The water baths are equipped with stirrers for circulating the bath liquid and (in larger baths) with table tennis balls to minimize the loss of liquid and heat.
  d) Temperature pen recorder with measuring probe
  e) Circulating air drying cabinet
  f) Retsch impact mill or Alpine hammer mill (depending on the amount of polymer to be ground)

1.2 Batch

The total filling amount is determined by the plate size and the piping thickness. The mould is filled here to only ⅘, to prevent the monomers from overflowing due to the thermal expansion during heating of the filled mould in the water bath.

The nature and concentration of the starting substances can be seen from the particular recipe.

The reaction mixture is composed of:
monomers, regulators, initiators;

1.3 Procedure

The bulk polymerization procedure is divided into the 6 general steps A to F, working of which can vary according to the circumstances in the particular recipe.

Step A:
Heating of the water bath to the given polymerization temperature.

Step B:
Laboratory batches: The monomers and regulators are weighed into a glass beaker and heated until the solution is homogeneous. The initiator is added to the hot solution. As soon as this has dissolved, the prepared glass mould, which has been preheated to approx. 75° C. in a drying cabinet, is filled with the mixture.

Pilot, plant batches: The metal tank is charged with the monomers and regulators and heated by means of a hot water circulation until the solution is homogeneous. The initiator is now added, and as soon as this has dissolved the prepared glass mould, which has been preheated to approx. 75° C. in a drying cabinet, is filled with the mixture.

Step C:
The filled mould is placed vertically in the water bath, which has been heated up to the given reaction temperature. The temperatures of the water bath and, if appropriate, of the reaction mixture in the mould are determined by means of the measuring probe and recorded on the temperature pen recorder.

Step D:
When the polymerization has ended, the mould is removed from the water bath and placed in a circulating air drying cabinet, which has been preheated to 120° C., for after-polymerization.

Step E:
When the after-polymerization has ended, the mould is allowed to cool to room temperature, the clamps and glass plates are removed and the release film is carefully peeled off without leaving a residue.

Step F:
Comminution of the sheets in a suitable mill (Retsch mill or Alpine hammer mill).

1.4 Analysis

The glass transition temperature of all the polymers is determined by means of differential scanning calorimetry (DSC).

The essential data and results for copolymers (iii) are given in table 1.

TABLE 1

The substance composition of the heat stabilizers (iii) used according to the invention Composition of the mixture to obtain (iii) in parts by wt.

| No. | Component (A1) | Component (B) | Component (A2) | Component (C) | Component (D) | Tg ° C. |
|---|---|---|---|---|---|---|
| 1 | 80 MMA | 20 MAA | 0 n-BA | 2.0 n-DDM | 0.2 LPO | 123.0 |
| 2 | 75 MMA | 20 MAA | 5 n-BA | 2.0 n-DDM | 0.2 LPO | 125.5 |
| 3 | 80 MMA | 20 MAA | 0 n-BA | 2.0 n-DDM | 0.2 LPO | 127.4 |
| 4 | 80 MMA | 20 MAA | 0 n-BA | 2.0 n-DDM | 0.4 TBPB | 132.7 |
| 5 | 80 MMA | 20 MAA | 0 n-BA | 2.0 n-DDM | 0.4/0.05 TBPB/LPO | 133.9 |
| 6 | 80 MMA | 20 MAA | 0 n-BA | 2.0 n-DDM | 0.4/0.1 TBPB/LPO | 134.1 |
| 7 | 80 MMA | 20 MAA | 0 n-BA | 1.8 n-DDM | 0.2 LPO | 130.9 |
| 8 | 80 MMA | 20 MAA | 0 n-BA | 1.6 n-DDM | 0.2 LPO | 133.9 |
| 9 | 80 MMA | 20 MAA | 0 n-BA | 1.8 n-DDM | 0.2 LPO | 130.9 |

TABLE 1-continued

The substance composition of the heat stabilizers (iii) used according to the invention Composition of the mixture to obtain (iii) in parts by wt.

| No. | Component (A1) | Component (B) | Component (A2) | Component (C) | Component (D) | Tg °C. |
|---|---|---|---|---|---|---|
| 10 | 80 MMA | 20 MAA | 0 n-BA | 2.0 n-DDM | 0.2 LPO | 123.0 |
| 11 | 80 MMA | 20 MAA | 0 n-BA | 2.0 n-DDM | 0.4 TBPB | 132.7 |
| 12 | 80 MMA | 20 MAA | 0 n-BA | 2.0 n-DDM | 0.4/0.05 TPPB/LPO | 133.9 |
| 13 | 80 MMA | 20 MAA | 0 n-BA | 2.0 n-DDM | 0.4/0.1 TBPB/LPO | 134.1 |
| 14 | 80 MMA | 20 MAA | 0 n-BA | 2.0 n-DDM | 0.2 LPO | 127.4 |
| 15 | 80 MMA | 20 MAA | 0 n-BA | 2.5 n-DDM | 0.4 LPO | 128.0 |
| 16 | 75 MMA | 20 MAA | 5 n-BA | 1.6 n-DDM | 0.2 LPO | 130.0 |
| 17 | 75 MMA | 20 MAA | 5 n-BA | 2.0 n-DDM | 0.2 LPO | 136.5 |
| 18 | 75 MMA | 20 MAA | 5 n-BA | 2.0 n-DDM | 0.2 LPO | 125.5 |
| 19 | 70 MMA | 25 MAA | 5 n-BA | 2.0 n-DDM | 0.2 LPO | 130.5 |
| 20 | 65 MMA | 25 MAA | 10 n-BA | 2.0 n-DDM | 0.2 LPO | 127.5 |
| 21 | 65 MMA | 20 MAA | 15 n-BA | 2.0 n-DDM | 0.2 LPO | 114.5 |
| 22 | 55 MMA | 25 MAA | 20 n-BA | 2.0 n-DDM | 0.2 LPO | 114.0 |
| 23 | 50 MMA | 30 MAA | 20 n-BA | 2.0 n-DDM | 0.2 LPO | 112.5 |
| 24 | 50 MMA | 30 MAA | 20 n-BA | 2.0 n-DDM | 0.2 LPO | 112.5 |
| 25 | 50 MMA | 30 MAA | 20 n-BA | 2.0 n-DDM | 0.8 TAPEH | 126.6 |
| 26 | 50 MMA | 30 MAA | 20 n-BA | 2.0 n-DDM | 0.4 TBPB | 134.5 |
| 27 | 50 MMA | 30 MAA | 20 n-BA | 2.0 n-DDM | 0.8 TBPB | 135.5 |
| 28 | 50 MMA | 30 MAA | 20 n-BA | 2.0 n-DDM | 1.6 TBPB | 131.6 |
| 29 | 50 MMA | 30 MAA | 20 n-BA | 2.0 n-DDM | 0.4 ACHCN | 129.9 |
| 30 | 50 MMA | 30 MAA | 20 n-BA | 2.0 n-DDM | 0.8 ACHCN | 129.1 |
| 31 | 50 MMA | 30 MAA | 20 n-BA | 2.0 n-DDM | 1.6 ACHCN | 123.8 |
| 32 | 50 MMA | 30 MAA | 20 n-BA | 2.0 n-DDM | 0.4 TBHP | 128.3 |
| 33 | 50 MMA | 30 MAA | 20 n-BA | 2.0 n-DDM | 0.8 TBHP | 126.8 |
| 34 | 50 MMA | 30 MAA | 20 n-BA | 2.0 n-DDM | 1.6 TBHP | 127.7 |
| 35 | 45 MMA | 35 MAA | 20 n-BA | 2.0 n-DDM | 0.2 LPO | 119.0 |
| 36 | 80 MMA | 20 MAA | 0 n-BA | 2.0 n-DDM | 0.2 LPO | 127.4 |
| 37 | 80 MMA | 20 MAA | 0 n-BA | 2.5 n-DDM | 0.4 LPO | 128.0 |
| 38 | 80 MMA | 20 MAA | 0 n-BA | 3.0 n-DDM | 0.4 LPO | 127.0 |
| 39 | 80 MMA | 20 MAA | 0 n-BA | 3.5 n-DDM | 0.4 LPO | 121.5 |
| 40 | 80 MMA | 20 MAA | 0 n-BA | 4.0 n-DDM | 0.4 LPO | 113.0 |
| 41 | 80 MMA | 20 MAA | 0 n-BA | 4.5 n-DDM | 0.8 LPO | 110.0 |
| 42 | 80 MMA | 20 MAA | 0 n-BA | 5.0 n-DDM | 0.8 LPO | 107.0 |
| 43 | 80 MMA | 20 MAA | 0 n-BA | 5.5 n-DDM | 0.8 LPO | 107.5 |
| 44 | 80 MMA | 20 MAA | 0 n-BA | 6.0 n-DDM | 0.8 LPO | 103.0 |
| 45 | 80 MMA | 20 MAA | 0 n-BA | 6.0 n-DDM | 1.5 LPO | 102.0 |
| 46 | 80 MMA | 20 MAA | 0 n-BA | 6.0 n-DDM | 2 LPO | 100.5 |
| 47 | 75 MMA | 20 MAA | 5 PEGMMA | 2.0 n-DDM | 0.2 LPO | 116 |
| 48 | 70 MMA | 20 MAA | 10 PEGMMA | 2.0 n-DDM | 0.2 LPO | 108 |
| 49 | 80 MA | 20 MAA | — | 2.0 n-DDM | 0.2 LPO | 31.5 |
| 50 | 70 MA | 30 MAA | — | 2.0 n-DDM | 0.2 LPO | 33.5 |
| 51 | 80 MMA | 20 AA | — | 2.0 n-DDM | 0.2 LPO | 111.0 |
| 52 | 75 MMA | 20 AA | 5 n-BA | 2.0 n-DDM | 0.2 LPO | 106.0 |
| 53 | 50 MMA | 30 AA | 20 n-BA | 2.0 n-DDM | 0.2 LPO | 93.5 |
| 54 | 80 MMA | 20 EA | — | 2.0 n-DDM | 0.2 LPO | 17.5 |
| 55 | 40 MMA | 20 MAA | 40 HEMA | 2.0 n-DDM | 0.2 LPO | 111.0 |
| 56 | 40 MMA | 20 MAA | 40 HPMA | 2.0 n-DDM | 0.2 LPO | 101.0 |

Explanations:
MMA = methyl methacrylate
MAA = methacrylamide
n-BA = n-butyl acrylate
n-DDM = n-dodecylmercaptan
LPO = lauryl peroxide
PEGMMA = poly(ethylene glycol) - methyl ether methacrylate
MA = methyl acrylate
AA = acrylamide
TBPB = tert.-butyl perbenzoate
TAPEH = tert.-amyl peroxy-2-ethylhexanoate
ACHCN = 1,1-azobiscyclohexanecarbonitrile
TBHP = tert.-butyl hydroperoxide
EA = ethyl acrylate
HEMA = hydroxyethyl methacrylate
HPMA = hydroxypropyl methacrylate 2. Emulsion and suspension polymers which are not according to the invention are prepared for comparison.

2.1. The preparation of the copolymer, which is not to be used according to the invention, according to EP-A-0 381 943 example 1 of the composition 75 wt. % methyl methacrylate, 5 wt. % n-butyl acrylate and 20 wt. % methacrylamide was carried out by the emulsion polymerization method described below.

2.1.1 Preparation instructions (emulsion polymer)

556 ml water, 1.5 g potassium stearate and 0.3 g sodium bicarbonate were initially introduced into a reactor and heated to 75° C. To the heated initial mixture, (a) a solution of 0.45 g potassium peroxodisulfate in 28.0 ml water (feed 1) and (b) 112.5 g methyl methacrylate and 7.5 g n-butyl acrylate (feed 2) were added simultaneously in the course of 2 hours, while stirring.

Twenty minutes after the end of feed 2, (c) 30.0 g methacrylamide in 69.3 ml water (feed 3) were added to the reaction mixture in the course of two hours.

The emulsion which resulted after an after-reaction time of 2 hours and had a solids content of 18.6 wt. % was used directly for the preparation of the moulding composition which is not according to the invention.

A portion of the copolymer contained in the suspension was isolated, dried and analysed. The values determined with the aid of chemical elemental analysis were in very good agreement with the theoretically calculated values. The glass transition temperature Tg of the copolymer was determined with the aid of differential thermal analysis (DSC) as 145° C. The resulting polymer is employed as polymeric material (iii) in comparison examples V2a to V2e.

2.1.2 Emulsion polymer (purified)

The copolymer obtained under 2.1.1 was filtered off, washed with water, dried, and used as a powder for the preparation of moulding compositions which are not according to the invention in comparison examples V3a to V3d.

2.2 The preparation of the copolymer, which is not to be used according to the invention, according to EP-A-0 381 943 example 2 of the composition 75 wt. % methyl methacrylate, 5 wt. % n-butyl acrylate and 20 wt. % methacrylamide was carried out by the suspension bead polymerization method described below.

2.2.1 Preparation instructions (suspension bead polymer)

The procedure was substantially as in 2.1.1, except that the amounts of the monomers and of the polymerisation initiator, the potassium stearate and the sodium bicarbonate were increased, so that a reaction batch with a solids content of 36 wt. % resulted. The copolymer obtained here was separated from the water, washed, dried, ground, and used as a powder for the preparation of moulding compositions which are not according to the invention from comparison examples V4a to V4e.

2.3 For comparison example V1, Ultramid® 1 C from BASF was employed as component (iii). This is mixed polyamides based on caprolactam, hexamethylenediamine, p,p'-diaminodicyclohexylmethane and adipic acid.

3. Preparation and properties of moulding compositions according to the invention (examples B1 to B56) and not according to the invention (comparison experiments V1 to V6):

3.1 General instructions for the experiments:

In examples B1 to B56 and comparison experiments V1 to V6, in each case a polyoxymethylene copolymer which is not degraded thermally (MVR=1.8 to 4.0 cm$^3$/10 minutes; determined in accordance with DIN ISO 1133 at 190° C. under a loading force of 2.16 kg), had been prepared from a mixture of 97.3 wt. % trioxane and 2.7 wt. % butanediol formal and still contained approximately 5 wt. % unreacted trioxane and approximately 3 wt. % thermally unstable formaldehyde adduct, was mixed with various amounts of additives (B) and additives (C) for heat stabilization in a dry mixer at a temperature of 23° C. The resulting pre-prepared mixtures were introduced at a temperature of 23° C. into a twin-screw extruder with a degassing device (type ZSK 28 from Werner und Pfleiderer, Stuttgart) and homogenized and degassed at 180 to 230° C., after which the homogenized mixture was forced out through a die as a strand and granulated.

3.2 To test the heat stability and tendency towards discoloration, the following were determined:

WL(N$_2$): The weight loss in wt. % of a sample of 1.2 g granules during heating at 222° C. under nitrogen for two and/or sixteen hours;

WL(air): Weight loss in wt. % of a sample of 1.2 g granules during heating at 222° C. in air for two and/or sixteen hours;

MVR: (melt volume rate) determined in accordance with ISO 1133 at 190° C. under a loading force of 2.16 kg;

CieLab values: Colorimetric determination of the colour separations L*, a* and b* (CieLab colour coordinates) of the granules after extrusion at the time 2 hours after storage in a circulating air drying cabinet at 140° C. in accordance with DIN 6174 (ASTM E 1347).

Table 2 gives an overview of the moulding compositions prepared which are not according to the invention and are according to the invention. The results of the abovementioned tests are summarized in table 3.

TABLE 2

The material composition of the moulding compositions not according to the invention (comparison examples V1 to V6) and according to the invention (example B1 to B56)

| Ex. No. | Component (i) | Composition in wt. % of component (ii) | | | Polymeric material (iii) |
|---|---|---|---|---|---|
| | | (ii) | (ii) | (ii) | |
| V1 | Ultraform ® H20-00 of Ultraform GmbH | Irganox ® 245 FF of Ciba Geigy | Melamine-formaldehyde condensate according to DE-PS-25 40 207 | Magnesium silicate Ambosol ® of Hoechst AG | Ultramid ® 1C of BASF AG |
| V1a | (99.40) | (0.35) | (0.2) | (0.05) | (0.02) |
| V2 | Ultraform ®H20-00 of Ultraform GmbH | Irganox ®245 FF of Ciba Geigy | Melamine-formaldehyde condensate according to DE-PS-25 40 207 | | Emulsion polymer according to 2.1.1 |
| V2a | (99.45) | (0.35) | (0.2) | | (0.28) |
| v2b | (99.45) | (0.35) | (0.2) | | (0.54) |
| V2c | (99.45) | (0.35) | (0.2) | | (1.08) |
| V2d | (99.45) | (0.35) | (0.2) | | (1.64) |
| V2e | (99.45) | (0.35) | (0.2) | | (2.72) |

TABLE 2-continued

The material composition of the moulding compositions not according to the invention
(comparison examples V1 to V6) and according to the invention (example B1 to B56)

| Ex. No. | Component (i) | Composition in wt. % of component (ii) | | Polymeric material (iii) |
|---|---|---|---|---|
| | | (ii) | (ii) | |
| V3 | Ultraform ® H20-00 of Ultraform GmbH | Irganox ® 245 FF of Ciba Geigy | Melamine-formaldehyde condensate according to DE-PS-25 40 207 | Purified emulsion polymer according to 2.1.2 |
| V3a | (99.45) | (0.35) | (0.2) | (0.05) |
| V3b | (99.45) | (0.35) | (0.2) | (0.10) |
| V3c | (99.45) | (0.35) | (0.2) | (0.20) |
| V3d | (99.45) | (0.35) | (0.2) | (0.30) |
| V4 | Ultraform ® H20-00 of Ultraform GmbH | Irganox ® 245 FF of Ciba Geigy | Melamine-formaldehyde condensate according to DE-PS-2S 40 207 | Suspension bead polymer according to 2.2.1 |
| V4a | (99.45) | (0.35) | (0.2) | (0.05) |
| V4b | (99.45) | (0.35) | (0.2) | (0.10) |
| V4c | (99.45) | (0.35) | (0.2) | (0.20) |
| V4d | (99.45) | (0.35) | (0.2) | (0.30) |
| V4e | (99.45) | (0.35) | (0.2) | (0.50) |

| Ex. No. | Component (i) | Composition in wt. % of component (ii) | | | | Polymeric material (iii) |
|---|---|---|---|---|---|---|
| | | (ii) | (ii) | (ii) | (ii) | |
| V5 | Ultraform ® H20-00 of Ultraform GmbH | Irganox 245 FF of Ciba Geigy | Melamine-formaldehyde condensate according to DE-PS-25 40 207 | Fatty acid ester Loxiol VP 1206 of Henkel | Magnesium silicate Ambosol of Hoechst AG | Ultramid 1C of BASF AG |
| V5a | (99.30) | (0.35) | (0.20) | (0.10) | (0.05) | (0.04) |
| V6 | Ultraform ® N20-00 of Ultraform GmbH | Irganox 245 FF of Ciba Geigy | Melamine-formaldehyde condensate according to DE-PS-25 40 207 | Magnesium silicate Ambosol of Hoechst AG | TPU Elastollan B85A of Elastogran | Ultramid 1C of BASF AG |
| V6a | (89.40) | (0.35) | (0.20) | (0.05) | (10.00) | (0.04) |
| V6b | (79.40) | (0.35) | (0.20) | (0.05) | (20.00) | (0.04) |
| V6c | (69.40) | (0.35) | (0.20) | (0.05) | (30.00) | (0.04) |

| Ex. No. | Component (i) | Composition in wt. % of component (ii) | | Polymeric material (iii) |
|---|---|---|---|---|
| | | (ii) | (ii) | |
| B | Ultraform ® H20-00 of Ultraform GmbH | Irganox ® 245 FF of Ciba Geigy | Melamine-formaldehyde condensate according to DE-PS-25 40 207 | copolymer B acc. to the invention |
| B1a | (99.45) | (0.35) | (0.2) | (0.05) |
| B1b | (99.45) | (0.35) | (0.2) | (0.10) |
| B1c | (99.45) | (0.35) | (0.2) | (0.20) |
| B1d | (99.45) | (0.35) | (0.2) | (0.30) |
| B2a | (99.45) | (0.35) | (0.2) | (0.05) |
| B2b | (99.45) | (0.35) | (0.2) | (0.10) |
| B2c | (99.45) | (0.35) | (0.2) | (0.20) |
| B2d | (99.45) | (0.35) | (0.2) | (0.30) |
| B3a | (99.45) | (0.35) | (0.2) | (0.05) |
| B3b | (99.45) | (0.35) | (0.2) | (0.10) |
| B3c | (99.45) | (0.35) | (0.2) | (0.20) |
| B | Ultraform ® H20-00 of Ultraform GmbH | Irganox ® 245 FF of Ciba Geigy | Melamine-formaldehyde condensate according to DE-PS-25 40 207 | copolymer B acc. to the invention |
| B4a | (99.45) | (0.35) | (0.2) | (0.05) |
| B4b | (99.45) | (0.35) | (0.2) | (0.10) |
| B4c | (99.45) | (0.35) | (0.2) | (0.20) |
| B4d | (99.45) | (0.35) | (0.2) | (0.30) |
| B5a | (99.45) | (0.35) | (0.2) | (0.05) |
| B5b | (99.45) | (0.35) | (0.2) | (0.10) |
| B5c | (99.45) | (0.35) | (0.2) | (0.20) |
| B5d | (99.45) | (0.35) | (0.2) | (0.30) |
| B5e | (99.45) | (0.35) | (0.2) | (0.50) |
| B | Ultraform ® H20-00 of Ultraform GmbH | Irganox ® 245 FF of Ciba Geigy | Melamine-formaldehyde condensate according to DE-PS-25 40 207 | copolymer B acc. to the invention |
| B6a | (99.45) | (0.35) | (0.2) | (0.05) |

TABLE 2-continued

The material composition of the moulding compositions not according to the invention
(comparison examples V1 to V6) and according to the invention (example B1 to B56)

| | | | | |
|---|---|---|---|---|
| B6b | (99.45) | (0.35) | (0.2) | (0.10) |
| B6c | (99.45) | (0.35) | (0.2) | (0.20) |
| B6d | (99.45) | (0.35) | (0.2) | (0.30) |
| B7a | (99.45) | (0.35) | (0.2) | (0.05) |
| B7b | (99.4S) | (0.35) | (0.2) | (0.10) |
| B7c | (99.45) | (0.35) | (0.2) | (0.20) |
| B7d | (99.45) | (0.35) | (0.2) | (0.30) |
| B7e | (99.45) | (0.35) | (0.2) | (0.50) |
| B8 | (99.45) | (0.35) | (0.2) | (0.10) |
| B9 | (99.45) | (0.35) | (0.2) | (0.10) |
| B | Ultraform ® H20-00 of Ultraform GmbH | Irganox ® 245 FF of Ciba Geigy | Melamine-formaldehyde condensate according to DE-PS-25 40 207 | copolymer B acc. to the invention |
| B10 | (99.45) | (0.35) | (0.2) | (0.10) |
| B11 | (99.45) | (0.35) | (0.2) | (0.10) |
| B12 | (99.45) | (0.35) | (0.2) | (0.10) |
| B13 | (99.45) | (0.35) | (0.2) | (0.10) |
| B14 | (99.45) | (0.35) | (0.2) | (0.10) |
| B15 | (99.45) | (0.35) | (0.2) | (0.10) |
| B16 | (99.45) | (0.35) | (0.2) | (0.10) |
| B17 | (99.45) | (0.35) | (0.2) | (0.10) |
| B18 | (99.45) | (0.35) | (0.2) | (0.10) |
| B19 | (99.45) | (0.35) | (0.2) | (0.10) |
| B20 | (99.45) | (0.35) | (0.2) | (0.10) |
| B | Ultraform ® H20-00 of Ultraform GmbH | Irganox ® 245 FF of Ciba Geigy | Melamine-formaldehyde condensate according to DE-PS-25 40 207 | copolymer B acc. to the invention |
| B21 | (99.45) | (0.35) | (0.2) | (0.10) |
| B22 | (99.45) | (0.35) | (0.2) | (0.10) |
| B23 | (99.45) | (0.35) | (0.2) | (0.10) |
| B24 | (99.45) | (0.35) | (0.2) | (0.10) |
| B25 | (99.45) | (0.35) | (0.2) | (0.10) |
| B26 | (99.45) | (0.35) | (0.2) | (0.10) |
| B27 | (99.45) | (0.35) | (0.2) | (0.10) |
| B28 | (99.45) | (0.35) | (0.2) | (0.10) |
| B29 | (99.45) | (0.35) | (0.2) | (0.10) |
| B30 | (99.45) | (0.35) | (0.2) | (0.10) |
| B31 | (99.45) | (0.35) | (0.2) | (0.10) |
| B32 | (99.45) | (0.35) | (0.2) | (0.10) |
| B | Ultraform ® H20-00 of Ultraform GmbH | Irganox ® 245 FF of Ciba Geigy | Melamine-formaldehyde condensate according to DE-PS-25 40 207 | copolymer B acc. to the invention |
| B33 | (99.45) | (0.35) | (0.2) | (0.10) |
| B34 | (99.45) | (0.35) | (0.2) | (0.10) |
| B35 | (99.45) | (0.35) | (0.2) | (0.10) |
| B36a | (99.45) | (0.35) | (0.2) | (0.50) |
| B36b | (99.45) | (0.35) | (0.2) | (1.00) |
| B36c | (99.45) | (0.35) | (0.2) | (5.00) |
| B36d | (99.45) | (0.35) | (0.2) | (10.00) |
| B37 | (99.45) | (0.35) | (0.2) | (0.10) |
| B38 | (99.45) | (0.35) | (0.2) | (0.10) |
| B39 | (99.45) | (0.35) | (0.2) | (0.10) |
| B40 | (99.45) | (0.35) | (0.2) | (0.10) |
| B41 | (99.45) | (0.35) | (0.2) | (0.10) |
| B | Ultraform ® H20-00 of Ultraform GmbH | Irganox ® 245 FF of Ciba Geigy | Melamine-formaldehyde condensate according to DE-PS-25 40 207 | copolymer B acc. to the invention |
| B42 | (99.45) | (0.35) | (0.2) | (0.10) |
| B43 | (99.45) | (0.35) | (0.2) | (0.10) |
| B44 | (99.45) | (0.35) | (0.2) | (0.10) |
| B45 | (99.45) | (0.35) | (0.2) | (0.10) |
| B46 | (99.45) | (0.35) | (0.2) | (0.10) |

| Ex. No. | Component (i) | Composition in wt. % of component (ii) | | | | Polymeric material (iii) |
|---|---|---|---|---|---|---|
| | | (ii) | (ii) | (ii) | (ii) | |
| B | Ultraform ® H20-00 of Ultraform GmbH | Irganox 245 FF of Ciba-Geigy | Melamine-formaldehyde condensate according to DE-PS-25 40 207 | Fatty acid ester Loxiol Vp 1206 of Henkel | Magnesium silicate Ambosol of Hoechst AG | Copolymer B acc. to the invention |
| B1e | (99.40) | (0.35) | (0.20) | (0.05) | — | (0.10) |
| B1f | (99.35) | (0.35) | (0.20) | (0.10) | — | (0.10) |
| B1g | (99.25) | (0.35) | (0.20) | (0.20) | — | (0.10) |

TABLE 2-continued

The material composition of the moulding compositions not according to the invention (comparison examples V1 to V6) and according to the invention (example B1 to B56)

| | | | | | |
|---|---|---|---|---|---|
| B1h | (99.15) | (0.35) | (0.20) | (0.30) | — | (0.10) |
| B1i | (98.95) | (0.35) | (0.20) | (0.50) | — | (0.10) |
| B1j | (99.30) | (0.35) | (0.20) | (0.10) | (0.05) | (0.10) |
| B1k | (99.25) | (0.35) | (0.20) | (0.10) | (0.10) | (0.10) |
| B51a | (99.45) | (0.35) | (0.20) | — | — | (0.10) |
| B51b | (99.35) | (0.35) | (0.20) | (0.10) | — | (0.10) |
| B51c | (99.25) | (0.35) | (0.20) | (0.20) | — | (0.10) |
| B51d | (99.15) | (0.35) | (0.20) | (0.30) | — | (0.10) |
| B51e | (99.30) | (0.35) | (0.20) | (0.10) | (0.05) | (0.10) |
| B51f | (99.25) | (0.35) | (0.20) | (0.10) | (0.10) | (0.10) |
| B | Ultraform ® H20-00 of Ultraform GmbH | Irganox 245 FF of Ciba-Geigy | Melamine-formaldehyde condensate according to DE-PS-25 40 207 | Fatty acid ester Loxiol VP 1206 of Henkel | Magnesium silicate Ambosol of Hoechst AG | Copolymer B acc. to the invention |
| B52 | (99.45) | (0.35) | (0.20) | — | — | (0.10) |
| B53 | (99.45) | (0.35) | (0.20) | — | — | (0.10) |
| B54 | (99.45) | (0.35) | (0.20) | — | — | (0.10) |
| B55 | (99.45) | (0.35) | (0.20) | — | — | (0.30) |
| B56 | (99.45) | (0.35) | (0.20) | — | — | (0.10) |
| B | Ultraform ® H20-00 of Ultraform GmbH | Irganox 259 of Ciba Geigy | Melamine-formaldehyde condensate according to DE-PS-25 40 207 | Fatty acid ester Loxiol VP 1206 of Henkel | Magnesium silicate Ambosol of Hoechst AG | Copolymer B acc. to the invention |
| B1l | (99.45) | (0.35) | (0.20) | — | — | (0.10) |
| B1m | (99.40) | (0.40) | (0.20) | — | — | (0.10) |
| B | Ultraform ® N20-00 of Ultraform GmbH | Irganox 245 FF of Ciba-Geigy | Melamine-formaldehyde condensate according to DE-PS-25 40 207 | Fatty acid ester Loxiol VP 1206 of Henkel | TPU Elastollan B85A of Elastogran | Copolymer B acc. to the invention |
| B1n | (89.35) | (0.35) | (0.20) | (0.10) | (10.00) | (0.10) |
| B1o | (79.35) | (0.35) | (0.20) | (0.10) | (20.00) | (0.10) |
| B1p | (69.35) | (0.35) | (0.20) | (0.10) | (30.00) | (0.10) |
| B | Ultraform ® H20-00 of Ultraform GmbH | Irganox 245 FF of Ciba-Geigy | Melamine-formaldehyde condensate according to DE-PS-25 40 207 | Carbon black Printex 90 of Degussa | Potassium carbonate | Copolymer B acc. to the invention |
| B1q | (99.1885) | (0.35) | (0.20) | (0.25) | (0.0115) | (0.20) |
| B1r | (99.1885) | (0.35) | (0.20) | (0.25) | (0.0115) | (0.30) |
| B1s | (99.1885) | (0.35) | (0.20) | (0.25) | (0.0115) | (0.50) |
| B23a | (99.20) | (0.35) | (0.20) | (0.25) | (0) | (0.20) |
| B23b | (99.495) | (0.35) | (0.20) | (0.25) | (0.005) | (0.20) |

| Ex. No. | Component (i) | Composition in wt. % of component (ii) | | Polymeric material (iii) |
|---|---|---|---|---|
| | | (ii) | (ii) | |
| B | Ultraform ® H20-00 of Ultraform GmbH | Irganox 259 of Ciba-Geigy | Melamine-formaldehyde condensate according to DE-PS-2S 40 207 | copolymer B acc. to the invention |
| B1t | (99.60) | (0.20) | (0.20) | (0.10) |
| B1u | (99.45) | (0.35) | (0.20) | (0.10) |

Explanations:
TPU = thermoplastic polyurethane
® Ultraform H20-00 is a polyoxymethylene copolymer which is not degraded thermally
® Irganox 245 FF is an antioxidant
MFC according to DE-PS 25 40 207 is a nucleating agent
® Ambosol is a costabilizer
® Ultramid 1C is a mixed polyamide, heat stabilizer

TABLE 3

Heat stability, melt viscosity and CieLab colour co-ordinates of the moulding compositions not according to the invention (comparison examples V1 to V6) and according to the invention (examples B1 to B56)

| Ex. No. | Heat Stability WL (N2) wt. % 2 h | 16 h | WL (air) wt. % 2 h | 6 h | Melt viscosity MVR [cm³/10 min] | CieLab colour coordinates after extrusion L* | a* | b* |
|---|---|---|---|---|---|---|---|---|
| V1 | 0.32 | 2.63 | 2.75 | 17.80 | 2.60 | 87.49 | −0.74 | 3.18 |
| V2a | 1.00 | — | 7.62 | — | 2.50 | 81.93 | −3.33 | 2.03 |
| V2b | 1.28 | — | 8.87 | — | 2.70 | 82.58 | −2.95 | 2.21 |
| V2c | 1.27 | — | 7.20 | — | 2.30 | 83.69 | −2.71 | 2.61 |
| V2d | 1.23 | — | 6.46 | — | 2.40 | 83.77 | −2.95 | 2.69 |
| V2e | 1.29 | — | 6.50 | — | 2.80 | 84.40 | −2.79 | 2.92 |
| V3a | 0.37 | — | 8.70 | — | 2.40 | 84.83 | −2.16 | 2.87 |
| V3b | 0.49 | — | 7.92 | — | 2.50 | 83.44 | −2.48 | 3.03 |
| V3c | 0.64 | — | 8.04 | — | 2.60 | 83.72 | −2.54 | 2.56 |
| V3d | 0.78 | — | 9.05 | — | 2.90 | 82.83 | −2.40 | 2.27 |
| V4a | 0.81 | — | 8.54 | — | 2.80 | 84.24 | −2.43 | 3.00 |
| V4b | 1.06 | — | 7.85 | — | 2.40 | 83.45 | −2.77 | 3.28 |
| V4c | 1.19 | — | 7.63 | — | 2.60 | 83.33 | −2.69 | 3.37 |
| V4d | 1.10 | — | 6.93 | — | 2.60 | 84.37 | −2.83 | 3.19 |
| V4e | 0.87 | — | 6.17 | — | 2.80 | 84.99 | −2.96 | 3.49 |
| V5a | 0.21 | 2.45 | 1.82 | 9.42 | 3.3 | 88.52 | −0.83 | 3.06 |
| V6a | 0.31 | n. d. | 0.92 | n. d. | 6.9 | 90.11 | −1.35 | 4.31 |
| V6b | 0.27 | n. d. | 1.19 | n. d. | 6.2 | 89.46 | −1.29 | 4.94 |
| V6c | 0.24 | n. d. | 0.71 | n. d. | 5.9 | 89.23 | −1.55 | 5.85 |
| B1a | 0.11 | 2.49 | 1.26 | 13.7 | 2.80 | 90.06 | −1.08 | 1.06 |
| B1b | 0.09 | 1.82 | 1.19 | 7.6 | 2.60 | 89.98 | −1.06 | 0.90 |
| B1c | 0.08 | 1.64 | 1.04 | 6.7 | 2.50 | 89.93 | −1.11 | 1.41 |
| B1d | 0.06 | 1.38 | 1.05 | 11.3 | 2.50 | 90.10 | −1.11 | 1.02 |
| B2a | 0.14 | 2.34 | 1.51 | 13.50 | 2.60 | 82.40 | −3.55 | 1.84 |
| B2b | 0.07 | 1.73 | 1.01 | 7.65 | 2.60 | 83.06 | −3.46 | 1.52 |
| B2c | 0.10 | 1.55 | 0.99 | 6.79 | 2.30 | 82.91 | −3.34 | 1.57 |
| B2d | 0.07 | 1.53 | 1.05 | 14.70 | 2.30 | 90.05 | −1.20 | 1.31 |
| B3a | 0.11 | 2.31 | 2.08 | 16.46 | 2.40 | 89.58 | −1.14 | 1.60 |
| B3b | 0.07 | 1.91 | 1.20 | 8.82 | 2.20 | 89.62 | −1.14 | 1.42 |
| B3c | 0.05 | 1.82 | 1.14 | 8.34 | 2.00 | 89.56 | −1.12 | 1.61 |
| B4a | 0.13 | 2.45 | 1.82 | 16.84 | 2.40 | 89.69 | −1.12 | 1.64 |
| B4b | 0.05 | 2.21 | 1.26 | 9.77 | 2.50 | 89.91 | −1.08 | 1.20 |
| B4c | 0.05 | 2.03 | 1.10 | 7.89 | 2.40 | 89.24 | −1.11 | 1.34 |
| B4d | 0.08 | 1.56 | 0.93 | 9.61 | 2.20 | 89.74 | −1.17 | 1.51 |
| B5a | 0.16 | 2.42 | 2.11 | 16.36 | 2.60 | 89.31 | −1.10 | 1.14 |
| B5b | 0.12 | 2.16 | 1.68 | 13.00 | 2.60 | 89.32 | −1.10 | 1.35 |
| B5c | 0.09 | 2.03 | 1.16 | 8.43 | 2.40 | 89.50 | −1.07 | 1.30 |
| B5d | 0.09 | 1.76 | 0.90 | 6.31 | 2.40 | 89.21 | −1.11 | 1.47 |
| B5e | 0.07 | 1.69 | 0.94 | 10.24 | 2.30 | 89.50 | −1.11 | 1.45 |
| B6a | 0.08 | 2.04 | 1.39 | 12.45 | 2.50 | 88.89 | −0.98 | 1.76 |
| B6b | 0.07 | 1.83 | 1.19 | 8.99 | 2.50 | 89.74 | −1.11 | 1.36 |
| B6c | 0.08 | 1.72 | 1.10 | 6.81 | 2.30 | 89.81 | −1.17 | 1.57 |
| B7a | 0.09 | 2.26 | 2.23 | 17.47 | 2.40 | 89.02 | −1.09 | 1.59 |
| B7b | 0.09 | 2.31 | 2.15 | 15.66 | 2.30 | 89.25 | −1.12 | 1.52 |
| B7c | 0.06 | 1.87 | 1.43 | 9.77 | 2.10 | 89.20 | −1.12 | 1.31 |
| B7d | 0.06 | 1.92 | 1.00 | 8.14 | 2.20 | 89.50 | −1.12 | 1.48 |
| B7e | 0.05 | 1.54 | 0.93 | 7.02 | 1.80 | 89.04 | −1.12 | 1.75 |
| B8 | 0.14 | 2.35 | 1.67 | 13.60 | 2.40 | 89.32 | −1.14 | 1.50 |
| B9 | 0.09 | 2.31 | 2.15 | 15.66 | 2.30 | 89.25 | −1.12 | 1.52 |
| B10 | 0.11 | 2.49 | 1.26 | 13.7 | 2.8 | 90.06 | −1.08 | 1.06 |
| B11 | 0.13 | 2.45 | 1.82 | 16.84 | 2.40 | 89.69 | −1.12 | 1.64 |
| B12 | 0.12 | 2.16 | 1.68 | 13.00 | 2.60 | 89.32 | −1.10 | 1.35 |
| B13 | 0.08 | 2.04 | 1.39 | 12.45 | 2.50 | 88.89 | −0.98 | 1.76 |
| B14 | 0.11 | 2.31 | 2.08 | 16.46 | 2.40 | 89.58 | −1.14 | 1.60 |
| B15 | 0.15 | 2.31 | 1.33 | 12.40 | 2.60 | 89.66 | −1.16 | 2.41 |
| B16 | 0.11 | 2.31 | 1.81 | 15.80 | 2.50 | 89.80 | −1.26 | 1.60 |
| B17 | 0.13 | 2.39 | 1.85 | 15.30 | 2.50 | 89.65 | −1.15 | 1.70 |
| B18 | 0.14 | 2.34 | 1.51 | 13.50 | 2.60 | 82.40 | −3.55 | 1.84 |
| B19 | 0.05 | 2.11 | 1.33 | 9.79 | 2.50 | 89.40 | −1.18 | 1.45 |
| B20 | 0.06 | 2.07 | 1.57 | 11.90 | 2.50 | 89.51 | −1.12 | 1.75 |
| B21 | 0.12 | 2.11 | 1.87 | 15.50 | 2.40 | 89.06 | −1.08 | 1.59 |
| B22 | 0.10 | 2.16 | 1.56 | 16.30 | 2.20 | 89.47 | −1.22 | 1.70 |
| B23 | 0.09 | 1.77 | 1.21 | 9.39 | 2.60 | 89.57 | −1.15 | 2.54 |
| B24 | 0.10 | 2.35 | 1.54 | 11.50 | 2.30 | 88.43 | −1.01 | 2.03 |
| B25 | 0.11 | 2.46 | 1.69 | 13.90 | 2.60 | 89.66 | −1.20 | 1.43 |
| B26 | 0.14 | 2.41 | 1.58 | 15.50 | 2.60 | 89.74 | −1.19 | 1.51 |
| B27 | 0.11 | 2.05 | 1.48 | 11.70 | 2.30 | 89.09 | −1.24 | 3.38 |
| B28 | 0.11 | 2.24 | 1.43 | 12.74 | 2.60 | 89.41 | −1.27 | 2.53 |
| B29 | 0.15 | 2.50 | 1.43 | 14.03 | 2.60 | 89.55 | −1.26 | 2.02 |
| B30 | 0.12 | 2.07 | 1.49 | 13.50 | 2.20 | 89.53 | −1.25 | 2.00 |
| B31 | 0.18 | 2.59 | 2.08 | 16.90 | 2.30 | 89.35 | −1.20 | 2.16 |
| B32 | 0.13 | 2.53 | 1.97 | 15.30 | 2.40 | 89.75 | −1.22 | 1.81 |
| B33 | 0.15 | 2.28 | 1.37 | 16.10 | 2.30 | 89.48 | −1.23 | 1.97 |
| B34 | 0.13 | 2.47 | 1.97 | 16.90 | 2.40 | 89.70 | −1.33 | 2.17 |
| B35 | 0.08 | 2.48 | 1.79 | 16.20 | 2.60 | 89.75 | −1.26 | 1.64 |
| B36a | 0.08 | 1.24 | 1.24 | 36.40 | 2.10 | 87.08 | −0.76 | 2.35 |
| B36b | 0.10 | 1.24 | 4.95 | 67.80 | 2.00 | 89.05 | −1.10 | 2.21 |
| B36c | 0.15 | 1.91 | 0.77 | 44.10 | 1.90 | 88.55 | −1.43 | 5.01 |
| B36d | 0.08 | 3.58 | 1.62 | 57.10 | 1.30 | 84.90 | −1.54 | 8.38 |
| B37 | 0.15 | 2.31 | 1.33 | 12.40 | 2.60 | 89.66 | −1.16 | 2.41 |
| B38 | 0.11 | 2.59 | 1.30 | 12.50 | 2.80 | 89.65 | −1.09 | 2.05 |
| B39 | 0.23 | 2.82 | 2.21 | 19.70 | 3.10 | 90.02 | −1.18 | 2.02 |
| B40 | 0.39 | 2.75 | 2.09 | 15.90 | 3.10 | 89.54 | −1.16 | 1.60 |
| B41 | 0.23 | 2.69 | 2.11 | 17.10 | 3.00 | 89.45 | −1.21 | 2.01 |
| B42 | 0.17 | 2.73 | 1.75 | 11.50 | 2.90 | 89.39 | −1.14 | 2.16 |
| B43 | 0.16 | 2.69 | 1.55 | 13.10 | 2.90 | 87.15 | −0.92 | 2.64 |
| B44 | 0.41 | 3.04 | 1.82 | 13.90 | 2.90 | 89.17 | −1.02 | 2.04 |
| B45 | 0.32 | 3.07 | 1.45 | 13.30 | 2.70 | 88.54 | −1.02 | 2.41 |
| B46 | 0.15 | 2.92 | 1.38 | 10.70 | 2.50 | 87.06 | −1.02 | 2.58 |
| B1e | 0.11 | 2.26 | 2.43 | 21.87 | 2.6 | 89.92 | −1.17 | 1.53 |
| B1f | 0.10 | 2.00 | 1.73 | 11.96 | 2.6 | 90.11 | −1.18 | 1.70 |
| B1g | 0.17 | 2.08 | 2.13 | 12.00 | 2.7 | 90.90 | −1.18 | 1.93 |
| B1h | 0.22 | 2.38 | 2.39 | n. d. | 2.7 | 90.85 | −1.13 | 2.23 |
| B1i | 0.29 | 4.33 | 2.21 | n. d. | 2.7 | 90.87 | −1.07 | 2.54 |
| B1j | 0.13 | 2.12 | 1.45 | 11.21 | 2.6 | 89.72 | −1.08 | 2.00 |
| B1k | 0.08 | 2.07 | 1.47 | 9.27 | 2.4 | 89.13 | −0.98 | 2.20 |
| B1l | 0.03 | 1.14 | 1.19 | 12.30 | 2.3 | 89.52 | −1.31 | 2.04 |
| B1m | 0.05 | 1.25 | 1.09 | 9.71 | 2.2 | 89.37 | −1.32 | 2.09 |
| B1n | 0.55 | 1.15 | 1.44 | 4.12 | 7.8 | 89.14 | −1.32 | 2.53 |
| B1o | 0.63 | 1.39 | 1.38 | 3.74 | 7.0 | 89.45 | −1.61 | 4.46 |
| B1p | 0.58 | 1.37 | 1.39 | 3.35 | 6.0 | 88.83 | −1.71 | 5.38 |
| B1q | 0.20 | n. d. | 2.22 | n. d. | 2.6 | — | — | — |
| B1r | 0.18 | n. d. | 1.90 | n. d. | 2.6 | — | — | — |
| B1s | 0.16 | n. d. | 1.48 | n. d. | 2.5 | — | — | — |
| B1t | 0.05 | 1.21 | 2.32 | 14.30 | 2.5 | 89.55 | −1.25 | 1.69 |
| B1u | 0.03 | 1.14 | 1.19 | 12.30 | 2.3 | 89.52 | −1.31 | 2.04 |
| B23a | 0.30 | n. d. | 1.88 | n. d. | 2.4 | — | — | — |
| B23b | 0.22 | n. d. | 1.67 | n. d. | 2.3 | — | — | — |
| B47 | 0.13 | 2.50 | 1.80 | 16.90 | 2.5 | 88.21 | −0.96 | 1.18 |
| B48 | 0.14 | 2.58 | 1.57 | 18.50 | 2.8 | 89.54 | −1.13 | 1.47 |
| B49 | 0.11 | 2.29 | 1.28 | 8.62 | 2.9 | 89.81 | 1.11 | 1.70 |
| B50 | 0.10 | 2.29 | 1.38 | 8.74 | 3.2 | 89.52 | −1.12 | 1.29 |
| B51a | 0.10 | 2.27 | 1.82 | 17.11 | 2.2 | 89.30 | −1.19 | 1.64 |
| B51b | 0.14 | 2.12 | 1.50 | 20.88 | 2.2 | 89.53 | −1.17 | 1.65 |
| B51c | 0.23 | 2.20 | 1.89 | 24.32 | 2.5 | 90.65 | −1.21 | 1.84 |
| B51d | 0.35 | 2.12 | 1.91 | 13.23 | 2.5 | 91.20 | −1.15 | 2.25 |
| B51e | 0.15 | 2.11 | 1.37 | 13.28 | 2.3 | 89.28 | −1.00 | 1.96 |
| B51f | 0.10 | 1.29 | 2.10 | 9.90 | 2.4 | 89.27 | −0.97 | 2.25 |
| B52 | 0.12 | 2.03 | 1.54 | 18.85 | 2.4 | 89.45 | −1.22 | 1.61 |
| B53 | 0.09 | 2.01 | 1.62 | 12.86 | 2.4 | 89.48 | −1.23 | 1.65 |
| B54 | 0.24 | 2.28 | 1.36 | 24.10 | 2.6 | 89.04 | −1.17 | 2.45 |
| B55 | 0.08 | 1.65 | 1.25 | 9.07 | 2.6 | 89.31 | −1.17 | 1.44 |
| B56 | 0.14 | 2.49 | 2.10 | 14.30 | 2.8 | 89.51 | −1.17 | 1.62 |

It can be deduced from the data of tables 2 and 3 that the heat stability of the polyoxymethylene moulding compositions stabilized according to the invention is better than that of those moulding compositions which are not stabilized with the copolymers which are not according to the invention according to EP-A-0 381 943 example 1 and 2 of the composition 75 wt. % methyl methacrylate, 5 wt. % n-butyl acrylate and 20 wt. % methacrylamide, both by the emulsion and by the suspension bead polymerization method. In particular, the examples stabilized according to the invention show a lower weight loss in air after 2 and 6 hours. Furthermore, the discoloration (CieLab colour coordinates), in particular the yellow discoloration (b* value), is significantly lower. Moreover, the brightness (L* value) of the granules stabilized according to the invention is significantly better than in the case of comparison examples V1–V6. Increasing the additive concentrations in comparison examples V2–V6 also does not lead to a substantial improvement in the heat stability, such as is to be observed without exception in the case of the examples according to the invention.

The improvements mentioned are achieved, in particular, if the co- or terpolymer according to the invention has a Tg of $\leq 145°$ C., preferably $\leq 140°$ C.

In the case of the examples stabilized according to the invention, it can therefore be claimed that polyoxymethylene moulding compositions with improved heat stability and stability against discoloration are present.

Furthermore, the numerical value of the MVR of the examples according to the invention is below that of the comparison examples, so that a positive effect can additionally be referred to here.

What is claimed is:

1. A polyoxymethylene moulding composition, comprising
   (i) at least one member selected from the group consisting of polyoxymethylene homopolymers and copolymers,
   (ii) at least one conventional additive, and
   (iii) at least one polymeric plastics material as an additive for improving heat stability, wherein:
      component (iii) is a copolymer which is obtained by polymerization in bulk of a mixture comprising:
         A) at least one:
            methacrylate of formula (I), in an amount of 35–90 parts

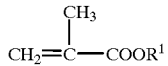

(I)

wherein $R^1$ denotes a linear or branched alkyl radical having 1–12 carbon atoms and
         one or more acrylates of formula (II) in an amount of 0–25 parts

(II)

wherein $R^2$ denotes a linear or branched alkyl radical having 1–12 carbon atoms, where the total amount of methacrylate and acrylate provides 60–90 parts of component A)
         B) 10–40 parts of at least one member selected from the group consisting of methacrylamide and acrylamide,
         C) per 100 parts of A)+B), >0.2 to 5 parts of molecular weight regulator, and
         D) per 100 parts of A)+B), up to 2 parts of lipophilic free radical polymerization initiators, and
      the moulding composition comprises component (iii) in an amount of 0.01 to 2 parts, based on the sum of (i)+(ii) where all the amounts relate to parts by weight (wt/wt) and A) and B) together are 100 parts.

2. The moulding composition according to claim 1, wherein:
   $R^1$ is at least one member selected from the group consisting of: methyl, ethyl and n-propyl.

3. The moulding composition according to claim 1 or claim 2, wherein:
   $R^2$ is at least one member selected from the group consisting of: n-propyl, n-butyl and n-pentyl.

4. The moulding composition according to claim 1, wherein
   C) is n-dodecylmercaptan.

5. The moulding composition according to claim 1, wherein
   D) is lauryl peroxide.

6. The moulding composition according to claim 1, wherein
   component (iii) is a copolymer which is obtained from the bulk polymerization of a mixture comprising:
      35–90 parts of a methacrylate of formula (I),
      0–25 parts of an acrylate of formula (II),
      10–40 parts of at least one member selected from the group consisting of methacrylamide and acrylamide,
      0.2–5 parts of a molecular weight regulator and
      0.1–2 parts of a lipophilic free radical polymerization initiator,
   wherein the sum of the parts of methacrylate, acrylate, methacrylamide and acrylamide equals 100 parts (wt/wt).

7. The moulding composition according to claim 6, wherein component (iii) is a copolymer which is obtained from the bulk polymerization of a mixture comprising:
   methyl methacrylate as defined by the methacrylate of formula (I);
   0 parts of an acrylate defined by formula (II);
   methacrylamide;
   n-dodecylmercaptan as a molecular weight regulator; and
   lauryl peroxide as a polymerization initiator.

8. The moulding composition according to claim 6, wherein component (iii) is a copolymer which is obtained from the bulk polymerization of a mixture comprising:
   methyl methacrylate as defined by formula (I);
   n-butyl acrylate as defined by formula (II);
   methacrylamide;
   n-dodecylmercaptan as a molecular weight regulator; and
   lauryl peroxide as a polymerization initiator.

9. The moulding composition according to claim 1, comprising component (iii) in an amount of from 0.02–1 parts of the moulding composition, based on the sum of components (i) and (ii), being 100 parts.

10. The moulding composition according to claim 9, wherein the amount of component (iii) is from 0.05–0.5 parts of the moulding composition.

11. The moulding composition according to claim 1, wherein
    (iii) is a copolymer or terpolymer which has a Tg of $\leq 145°$ C.

12. The moulding composition according to claim 11, wherein the Tg is $\leq 140°$ C.

13. A process for the production of a shaped article or a film from a moulding composition defined by claim 1, comprising:
   (1) melting and mixing the constituents of the moulding composition in an extruder at 150° to 260° C. and
   (2) shaping of the resulting moulding composition to form the shaped article or the film, wherein
   the moulding composition according to claim 1, is a reinforced or non-reinforced polyoxymethylene moulding composition.

14. A shaped article made of a moulding composition according to claim 1.

15. A film made of a moulding composition according to claim 1.

16. A process for using copolymers to heat stabilize moulding compositions which contain at least one polymer selected from polyoxymethylene homopolymers and polyoxymethylene copolymers comprising:

adding copolymers obtained by bulk polymerization of a mixture of
A) at least one methacrylate of the formula (I) in an amount of 35–90 parts

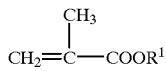
(I)

wherein $R^1$ denotes a linear or branched alkyl radical having 1–12 carbon atoms and
one or more acrylates of formula (II) in an amount of 0–25 parts

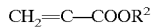

wherein $R^2$ denotes a linear or branched alkyl radical having 1–12 carbon atoms, where the total amount of methacrylate and acrylate provides 60–90 parts of component A);
B) 10–40 parts of at least one member selected from the group consisting of methacrylamides and acrylamides;
C) per 100 parts of A) and B), >0.2–5 parts of molecular weight regulator; and
D) per 100 parts of A)+B), up to 2 parts of lipophilic free radical polymerization initiators, wherein all the amounts are parts by weight (wt/wt) and A) and B) are selected such that together they form 100 parts, to a molding composition comprising at least one polymer selected from polyoxymethylene homopolymers and polyoxymethylene copolymers, thereby heat stabilizing the moulding composition.

17. The process according to claim 16, further comprising:

adding the copolymers in an amount of 0.1 to 2 parts, based on 100 parts of moulding composition, the 100 parts being calculated without the copolymers.

* * * * *